United States Patent
Shintani et al.

(10) Patent No.: US 7,129,823 B2
(45) Date of Patent: Oct. 31, 2006

(54) COMMUNICATIONS SETTING METHOD AND COMMUNICATIONS SETTING SYSTEM FOR POWER LINE COMMUNICATIONS SYSTEM

(75) Inventors: Yasuyuki Shintani, Nishinomiya (JP); Shigeo Yoshida, Takatsuki (JP); Akira Koji, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 863 days.

(21) Appl. No.: 10/075,570

(22) Filed: Feb. 13, 2002

(65) Prior Publication Data
US 2002/0126000 A1    Sep. 12, 2002

(30) Foreign Application Priority Data
Feb. 14, 2001   (JP) .............................. 2001-037753
Feb. 14, 2001   (JP) .............................. 2001-037754

(51) Int. Cl.
*G05B 11/01* (2006.01)

(52) U.S. Cl. ................. 340/310.16; 340/3.1; 340/3.54; 340/310.11; 340/825.21; 340/825.22

(58) Field of Classification Search ..................... None
See application file for complete search history.

(56) References Cited

U.S. PATENT DOCUMENTS

| | | | | |
|---|---|---|---|---|
| 4,200,862 A | * | 4/1980 | Campbell et al. | ...... 340/310.01 |
| 4,495,573 A | * | 1/1985 | Ballegeer et al. | ........... 710/110 |
| 4,872,003 A | * | 10/1989 | Yoshida | ................. 340/825.21 |
| 5,061,922 A | * | 10/1991 | Nishijima et al. | ..... 340/825.52 |
| 5,305,355 A | * | 4/1994 | Go et al. | ..................... 375/356 |
| 5,491,463 A | * | 2/1996 | Sargeant et al. | ....... 340/310.01 |
| 5,530,896 A | * | 6/1996 | Gilbert | ........................... 710/9 |
| 5,815,660 A | * | 9/1998 | Momona | ..................... 709/208 |
| 5,838,226 A | | 11/1998 | Houggy et al. | .......... 340/10.31 |
| 5,945,936 A | * | 8/1999 | Issa | ............................ 341/176 |
| 6,085,191 A | * | 7/2000 | Fisher et al. | ..................... 707/9 |
| 6,088,516 A | * | 7/2000 | Kreisel et al. | .............. 709/221 |
| 6,195,688 B1 | * | 2/2001 | Caldwell et al. | ............ 709/208 |
| 6,281,784 B1 | * | 8/2001 | Redgate et al. | ........ 340/310.01 |
| 6,633,538 B1 | * | 10/2003 | Tanaka et al. | .............. 370/222 |
| 6,750,781 B1 | * | 6/2004 | Kim | ...................... 340/825.69 |
| 6,782,436 B1 | * | 8/2004 | Baker | .......................... 710/43 |
| 2003/0107471 A1 | * | 6/2003 | Tsubone | .................... 340/5.22 |

FOREIGN PATENT DOCUMENTS

| | | |
|---|---|---|
| DE | 199 04 358 A | 8/2000 |
| EP | 0 852 419 A | 7/1998 |
| EP | WO 00/51248 | 8/2000 |

OTHER PUBLICATIONS

European Search Report for EP 02 00 3362, dated Jan. 30, 2003.
European Search Report for Application No. EP 02 00 3362, Aug. 5, 2003.

* cited by examiner

*Primary Examiner*—Benjamin C. Lee
*Assistant Examiner*—Son Tang
(74) *Attorney, Agent, or Firm*—RatnerPrestia

(57) ABSTRACT

A communications setting method for a communications network system for performing data communications among a plurality of devices through power line has a house code notification including a house code to be uniquely set for the communications network system is transmitted from a first device in the communications network system to a second device in the communications network system more than once in a first predetermined time period.

10 Claims, 18 Drawing Sheets

COMMUNICATIONS SETTING METHOD AND COMMUNICATIONS SETTING SYSTEM FOR POWER LINE COMMUNICATIONS SYSTEM

BACKGROUND OF THE INVENTION

1. Field of the Invention

The present invention relates to a communications setting method for a power line communications networksystem, a communications setting system in a power line communications network system, a management change method for a power line communications networksystem, a management change system in a power line communications network system, an address assignment management method for a power line communications networksystem, an address assignment management system in a power line communications networksystem, etc. for communications among communications appliances in a power line communications system using the power line as communications media.

2. Related Art of the Invention

In a power line communications system using the power line as communications media, a house code which is a unique identification code is assigned to a communications appliance of a house or system unit to avoid jamming by the leakage of a signal to, or an external invading signal from the device used in a neighbor's house so that the communications appliances in the power line communications system can transmit an assigned house code by including it in the transmission data, and receive only the data including the assigned house code while discarding the data including the house codes other than the assigned house code.

However, when the power line communications system is set, it is necessary for a installer of the system to set a house code for each appliance using a rotary switch or a dip switch, or to set it using an exclusive setting jig when the system is installed. The method of using a dip switch has the problem that a small appliance cannot be realized or a mis-setting can be made. Additionally, the method of using an exclusive setting jig requires the jig for the installation.

With these problems taken into account, there has been a method suggested for setting a house code with the load of the installer reduced by transmitting and receiving a house code setting command between a house code setting device and a new connection setting appliance.

The conventional system of transmitting and receiving a house code setting command between a house code setting device and a new connection setting appliance can be either a system in which a conventional house code setting device and a new connection setting appliance establish one-to-one communications with each other, or a system in which it is necessary to set in advance a setting address to avoid overlaps in the new connection setting appliance for transmission and reception of a house code setting command. Especially, the latter system requires a very complicated operation of setting an address without overlaps when the installer sets an address, thereby possibly causing a mis-setting problem. Furthermore, when a unique address is assigned in advance, there also can be the problem that a high cost is required to appropriately manage the addresses and individually set the addresses for the respective appliances.

On the other hand, in the former system, it is necessary to provide a blocking filter between a house code setting device and a new connection setting appliance to have a system configuration in which the data from other households or other systems can be rejected. In this case, the system cannot be realized without the blocking filter.

Furthermore, in these systems, there has been no means of appropriately managing addresses when the appliances for communications, the appliances for management of communications, etc. are to be replaced after various settings have once been made.

SUMMARY OF THE INVENTION

The present invention has been developed to solve the above mentioned problems, and aims at providing a power line communications setting system and method for easily setting a house code and an address with appliances without installing a costly blocking filter and address management by an installer, and easily managing addresses and connection appliances after the installation.

One aspect of the present invention is a communications setting method for a communications network system for performing data communications among a plurality of devices through power line, wherein a house code notification including a house code to be uniquely set for the communications network system is transmitted from a first device in the communications network system to a second device in the communications network system more than once in a first predetermined time period.

Another aspect of the present invention is the communications setting method, wherein the house code notification includes identification information which can be received by a device whose house code has not been set.

Still another aspect of the present invention is the communications setting method, wherein the second device obtains the house code when receiving the house code notification successively at predetermined times in a second predetermined time period.

Yet still another aspect of the present invention is the communications setting method, wherein upon receipt of house code notifications including different house codes in the second predetermined time period, the second device discards the house codes.

Still yet another aspect of the present invention is the communications setting method, wherein after holding the house code, the second device transmits an address setting request including a terminal identification code uniquely identifying the second device to the first device.

A further aspect of the present invention is the communications setting method, wherein upon receipt of the address setting request, the first device transmits a terminal address of the second device together with the terminal identification code to the second device.

A still further aspect of the present invention is the communications setting method, wherein the first device starts transmitting the house code notification by a user operation.

A yet further aspect of the present invention is the communications setting method, wherein the second device enters a waiting state for receiving a house code notification if the house code is not set when power is turned on.

A still yet further aspect of the present invention is a communications network system in which data communications is performed among a plurality of devices including a first device and a second device through power line, wherein the first device comprises house code storage portion storing a house code to be uniquely set for the communications network system; and transmission portion transmitting a house code notification including the house code more than once in a first predetermined time period to the second device; and the second device comprises reception portion receiving the house code notification transmitted from the first device; and house code obtaining portion obtaining the house code when receiving the house code notification successively at predetermined times in a second predetermined time period.

An additional aspect of the present invention is a device connected to a communications network system which performs data communications through power line, wherein a house code notification including a house code to be uniquely set for the communications network system is transmitted more than once in a predetermined time period to a second device connected to the communications network system.

A still additional aspect of the present invention is the device, wherein the house code notification includes identification information which can be received by a device whose house code has not been set.

A yet additional aspect of the present invention is the device, wherein when an address setting request including terminal identification code for unique identification of the second device is received, a terminal address of the second device is transmitted to the second device together with the terminal identification code.

A still yet additional aspect of the present invention is the device, wherein transmitting the house code notification is started by a user operation.

A supplementary aspect of the present invention is a device connected to a communications network which performs data communications through power line, wherein a house code notification including a house code to be uniquely set for the communications network system is received from another device connected to the communications network system.

A still supplementary aspect of the present invention is the device, wherein the house code is obtained when the house code notification is received successively at predetermined times in a predetermined time period.

A yet supplementary aspect of the present invention is the device, wherein when house code notifications including different house codes are received in the predetermined time period, the house codes are discarded.

A still yet supplementary aspect of the present invention is the device, wherein after holding the house code, an address setting request including a terminal identification code for unique identification of the device is transmitted to said another device.

Another aspect of the present invention is the device, wherein if a house code is not set when power is turned on, the device enters a waiting state for receiving a house code notification.

Still another aspect of the present invention is a method of transferring a master function of a device connected to a communications network system which performs data communications among a plurality of devices through power line, wherein the master function is to set a house code or a terminal address to another device;

a first device having the master function and an address table holding terminal addresses which can be assigned to other devices transmits the address table to a second device when the first device receives from the second device an address table transmission request indicating a transmission request of the address table, upon receipt of the address table, the second device retrieves from the address table an unused address which can be assigned as a terminal address to the first device, and transmits to the first device a request to change a terminal address into the unused address and a request to invalidate the master function; and the second device enables its own master function when the first device changes its own terminal address into the unused address, and invalidates the master function.

Yet still another aspect of the present invention is the method of transferring a master function of a device, wherein the second device transmits to the first device an address table transmission request indicating a transmission request of the address table by a user operation.

Still yet another aspect of the present invention is a communications network system which performs data communications through power line among a plurality of devices including a first device and a second device having a terminal address and a master function of setting a house code or a terminal address, wherein the first device comprises means for holding an address table which holds terminal addresses assignable to other devices, means for receiving an address table transmission request to transmit the address table, and means for transmitting the address table;

the second device comprises means for transmitting the address table transmission request, means for receiving the address table, means for retrieving from the address table received by means for receiving an unused address which can be assigned as a terminal address to another device, and means for transmitting a request to change the terminal address into the unused address and a request to invalidate the master function; and the second device enables its own master function when the first device changes the terminal address into the unused address and invalidates the master function.

A further aspect of the present invention is a device which has a master function, and is connected to a communications network system which performs data communications through power line, wherein the master function is to set a house code or a terminal address to another device and the device comprises means for storing an address table holding terminal addresses assignable to other devices, means for receiving an address table transmission request to transmit the address table, and means for transmitting the address table at the address table transmission request.

A still further aspect of the present invention is the device, wherein when a terminal address, a request to change the terminal address, and a request to invalidate the master function are received, the terminal address of the device is changed to the terminal address received and the master function is invalidated.

A yet further aspect of the present invention is the device, wherein an address setting completion notification indicating that the address has been changed into the terminal address received, and that the master function has been invalidated is transmitted.

A still yet further aspect of the present invention is the device, wherein the address table includes address assignment information indicating whether or not a terminal address has been assigned.

An additional aspect of the present invention is a device which has a master function and is connected to a communications network system, wherein the master function is to set a house code or a terminal address to another device; and the device comprises:

means for obtaining an address table holding terminal addresses assignable to other devices; and means for extracting a terminal address assignable to another device from the address table, and transmitting the terminal address, a request to change into the terminal address, and a request to invalidate a master function of another device having the master function.

A still additional aspect of the present invention is the device, wherein the address table further includes address assignment information indicating whether or not a terminal address has been assigned to said another device.

A yet additional aspect of the present invention is the device, wherein after receiving the address setting completion notification, the master function of the device is enabled.

A still yet additional aspect of the present invention is a device connected to a communications network system which performs data communications among a plurality of devices through power line, wherein an address table including terminal addresses of other devices and address assignment information indicating whether or not the terminal addresses have been assigned is held, and a reply request is periodically transmitted to other devices when a number of pieces of the address assignment information is equal to larger than a predetermined value.

A supplementary aspect of the present invention is the device, wherein the address table records a number of times of no reply in response to the reply request for each assigned terminal address and the address assignment information about a terminal address for which the number of times of no-reply exceeds a predetermined value is changed from 'assigned' to 'unassigned'.

A still supplementary aspect of the present invention is a program of causing a computer to realize a function of transmitting a house code notification including a house code more than once in a predetermined time period.

A yet supplementary aspect of the present invention is a program of causing a computer to realize a function of obtaining a house code when a house code notification including the house code is received successively at predetermined times in a predetermined time period.

A still yet supplementary aspect of the present invention is a computer processable medium bearing the program.

Another aspect of the present invention is a computer processable medium bearing the program.

REFERENCE NUMERALS

Figure 1:
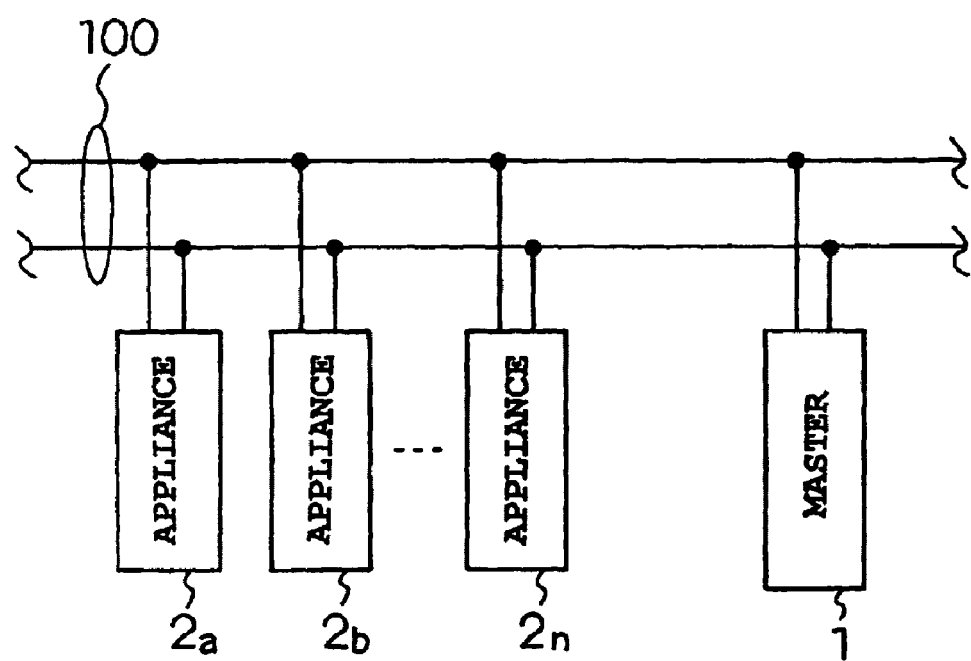
FIG. 1 shows a configuration of the power line communications system according to the first embodiment of the present invention.

1 master
2a–2n appliance
3 old master
4 new master
11, 21 modem
12, 22 processing unit
13, 23 memory
14, 24 operation state switching button
15 master function enable/disable switching button
16 monitor LED by type
17 monitor LED for operation mode
18 buzzer 19, 24 set ID input unit
100 power line
110 pseudo-random data generation unit

EMBODIMENT

The present invention is described below in detail by referring to the attached drawings.

(First Embodiment)

FIG. 1 shows an example of the power line communications network setting system and the power line communications network setting method according to the present invention. At least one of a plurality of appliances connected to the power line is a master having the function of setting a house code and an address for another appliance. The master has already been assigned a house code and an address.

In this system, appliances 2a to 2n has power line 100 as communications media, and a master 1 sets house codes and addresses for the appliances 2a to 2n in the method described later.

On the other hand, newly connected appliances 2a to 2n have no master function of setting house codes and addresses for other appliances, but are connected to a power line communications network with no house code set, but a provisional house code set for provisional identification of an appliance in the network by the master 1 already existing in the power line communications network, and a provisional address set for provisional identification of itself by the master 1 already in the power line communication network when communications are started.

Using the provisional house code, the communications described later can be established through the power line 100 from the master 1 to set a formal house code in the appliances 2a to 2n.

Figure 2:
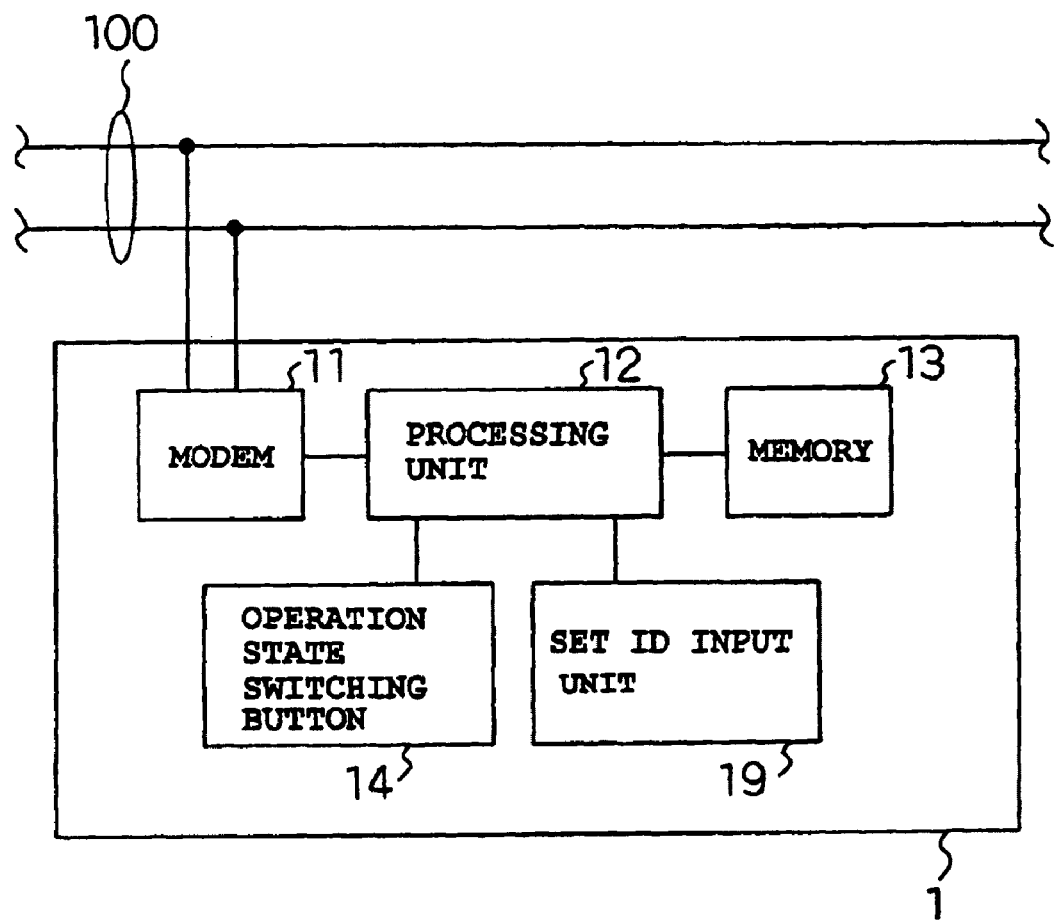
FIG. 2 shows a configuration of the master according to the first embodiment of the present invention.

As shown in FIG. 2, the master 1 comprises a modem 11, a processing unit 12, memory 13, and an operation state switching button 14.

Upon receipt of a signal from the processing unit 12, the modem 11 transmits the signal to the power line 100 in the transmitting process, and passes the signal with the commercial voltage cut off the power line 100 as a received signal to the processing unit 12 in the receiving process.

The processing unit 12 is means of performing transmitting process and receiving process. In the transmitting process, the house code and the address (a provisional address or a formal address set by the master 1 as described later) of the correspondent appliance are read from the memory 13, and a transmission signal is generated using the read house code and address, and a command to set a house code and a formal address. The generated transmission signal is passed to the modem 11.

Additionally, in the receiving process, the following operation is performed upon receipt of a signal including a house code, an address, and a command to set the house code and the formal address from the modem 11. First, the house code in the signal is compared with its own house code stored in the memory 13. If they match each other, then the address in the signal is compared with the address stored in the memory 13. If the address from the modem 11 matches its own address, or if it matches a broadcast address, then the processing unit 12 transmits an instruction to continue reception, etc. to the modem 11. If the house code and the address do not match, then the message is discarded.

The memory 13 is a storage device in which data can be read and written, stores the house code of the master, its own master address, the addresses set in the appliances 2a to 2n, the broadcast address set commonly and uniquely in other appliances connected to the power line communications network, and an address table described later, and can be realized by, for example nonvolatile memory.

The operation state switching button 14 switches the states of the operations performed by a user, and can accept from the user an instruction for the master 1 to change from a normal state to a house code and address setting state. The operation state switching button 14 is displayed as a direct operable button by a user, but can also be configured as a switch, a communications interface, and an application software interface of a personal computer, etc. so as to be operated by a user on the screen of the application on the display of a personal computer.

Figure 3:
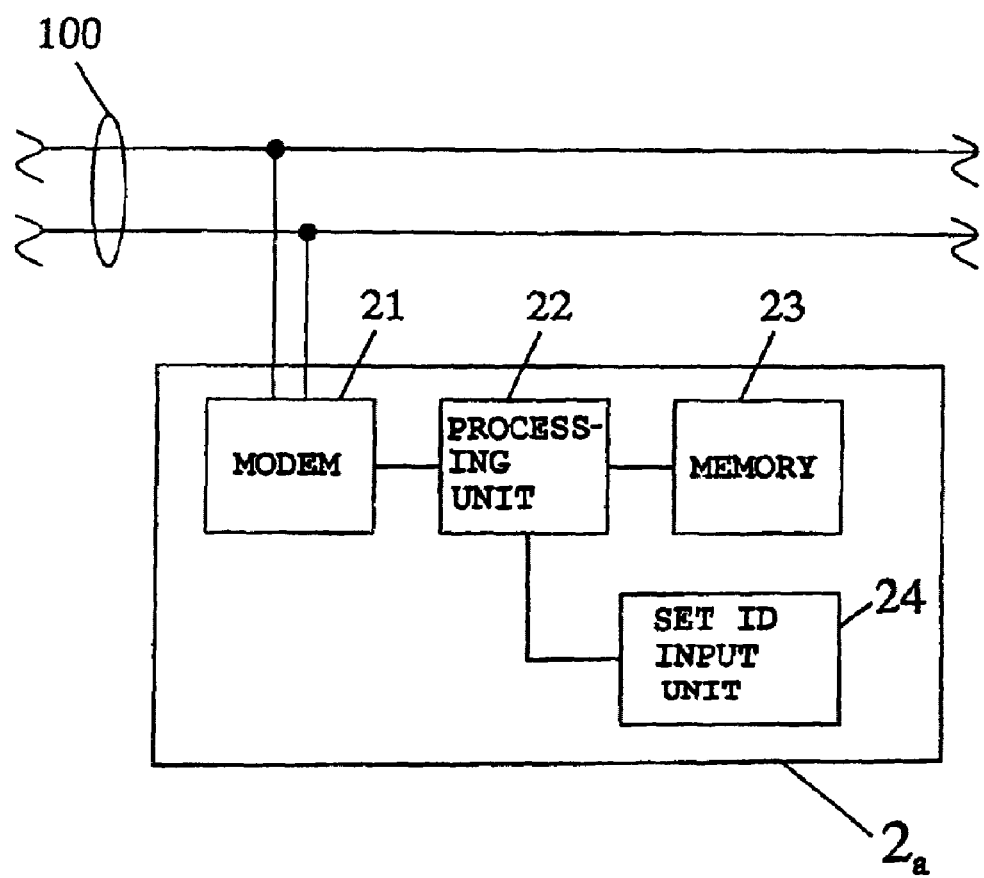
FIG. 3 shows a configuration of the appliance according to the first embodiment of the present invention.

As shown in FIG. 3, the appliance 2a comprises a modem 21, a processing unit 22, and memory 23. Since the modem 21 has the same functions as the modem 11, the detailed explanation of the functions is omitted here.

In addition to the same functions as those of the processing unit 12, the processing unit 22 also has the following functions. That is, if the address in the signal received from the modem 21 matches the provisional address stored in the memory 23, and a house code setting command is detected in the signal, then the processing unit 22 checks whether or not the house code is stored in the memory 23. If it is not stored, the house code in the signal is stored in the memory 23 based on the sequence described later. Then, if an address setting command is received, the address contained in the address setting command is stored in the memory 23 as a formal address of the appliance according to the sequence described later.

The memory 23 is also a storage device in which data can be read and written, and is realized by, for example, non-volatile memory as the memory 13. It has no stored house code until it is connected to a power line communication network, and stores a provisional address for provisional identification by the master 1 when communications are started. Furthermore, the memory 23 is connected to a power line communications network, and stores a set house code and address after they are set by the master 1.

The configuration of the appliances 2b to 2n is the same as the configuration of the appliance 2a, and the detailed explanation is omitted here.

The master 1 and the appliances 2a to 2n can comprise, for example, air-conditioning unit as an air-conditioning system in addition to the modems 11 and 21, the processing units 12 and 22, and the memory 13 and 23, and also wattmeter unit and monitor means as a wattmeter and a power monitor.

Furthermore, the master 1 and the appliances 2a to 2n can be connected to the appliances such as an air-conditioner, a wattmeter, a power monitor, etc. from the processing units 12 and 22 through an interface. The character 'n' of the appliance 2n indicates an arbitrary ordinal number of an appliance.

Described below are the operations of the communications setting system of the power line communications network according to the present embodiment with the above mentioned configuration. Also described is an embodiment of the operation according to the communications setting method, the first device, and the second device according to the present invention.

However, in the following explanation, it is assumed that a unique house code and a master address to specify a master uniquely are set in advance in the master 1 when the system is delivered from the factory. The house code can be a value only for identification in a predetermined district or area such as a city, a ward, a prefecture, etc., that is, the value is not always unique.

On the other hand, the newly connected appliances 2a to 2n have no master functions of setting a house code and an address for another appliance, and is connected to a power line communications network with no house code set, and with a provisional address set for provisional identification by the master 1 already existing in the power line communications network when communications are started.

Figure 4:
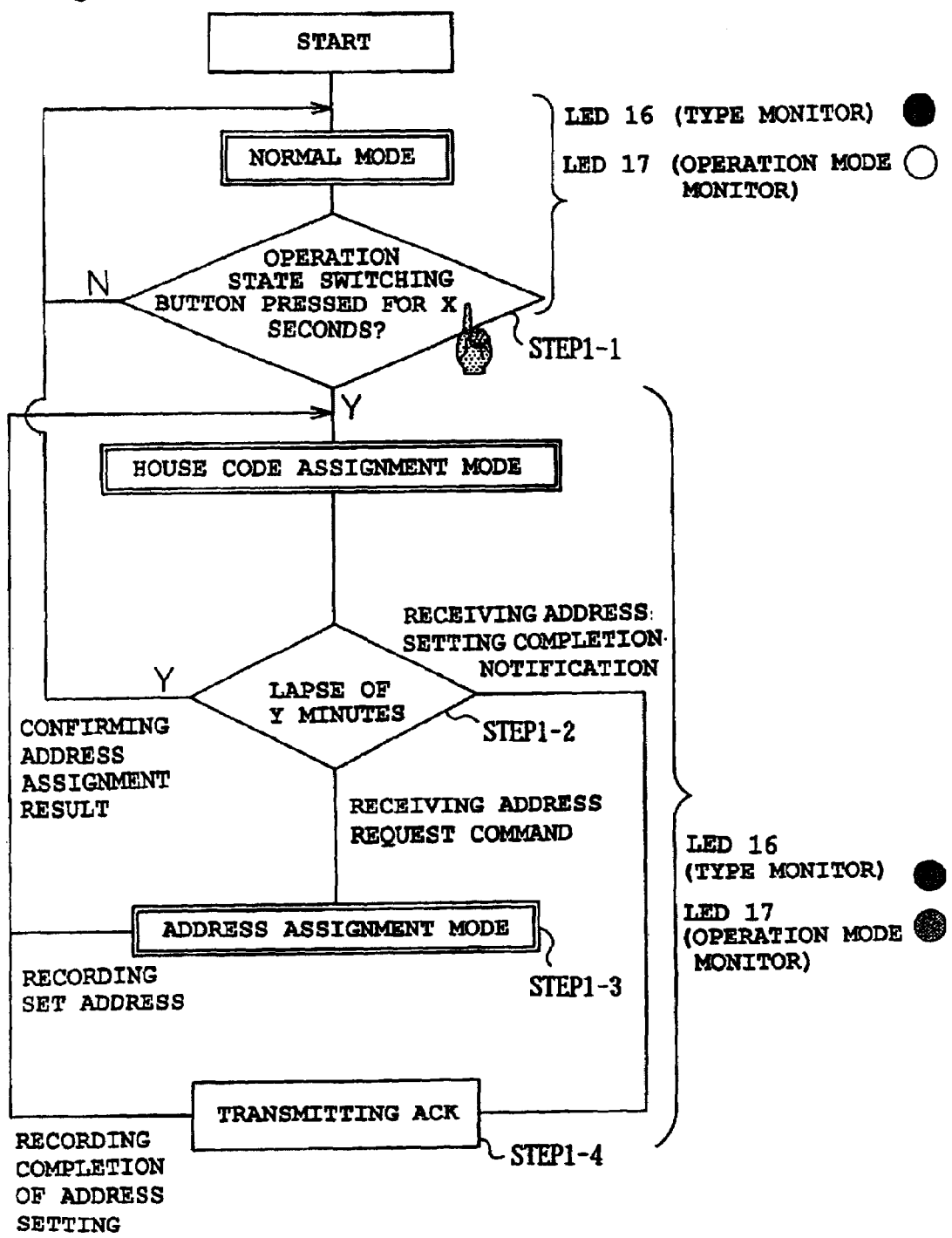
FIG. 4 is a flowchart of setting a house code and an address of the master according to the first embodiment of the present invention.

First, the operations of the master 1 are described below according to the flow of setting a house code and an address for the master 1 as shown in FIG. 4.

The user operates the operation state switching button 14 of the master 1 before newly connecting an appliance to the power line 100 (STEP 1-1).

As a result, using the operation state switching button 14, an instruction to change from the normal state to the master 1 to the state where the master set the house code and an address to the appliance (hereinafter the state is abbreviated as "the house code and address setting state") is input into the processing unit 12 of the master 1. At this time, it is desired that a wrong operation prevention measure is can be provided by, for example, preventing the master 1 from changing its state unless the operation state switching button 14 is continuously pressed for longer than a predetermined time (X seconds as shown in FIG. 4) although the user pushes a button carelessly.

The house code and address setting state can be either a house code assignment mode or an address assignment mode. In the normal process, the state is changed from the house code assignment mode to the address assignment mode.

When the master 1 changes from the normal state to the house code assignment mode of the house code and address setting state, it starts transmitting its own house code as house code announcement data together with a provisional house code to a provisional address at predetermined intervals, thereby assigning a house code to an appliance which has been connected to a power line, but whose house code has not been assigned. The time intervals can be adjusted by the user.

When a time-out period (Y minutes) for the house code assignment mode passes, the master 1 changes from the house code assignment mode to the normal mode, thereby terminating the transmission of a house code to a provisional address in a predetermined period (STEP 1-2). It is desired that the time-out period of the house code assignment mode is shorter in consideration of communications traffic. A user can adjust the length of a time period.

On the other hand, upon receipt of an address request command from the appliance assigned a house code until the timeout period for the house code assignment mode, the master 1 changes from the house code assignment mode to the address assignment mode (STEP 1-3).

The master 1 retrieves from the address table an address not assigned to an appliance according to the address assignment information, and transmits to a provisional address an address setting command containing a retrieved unassigned address.

Upon receipt of an address setting completion notification from the appliance 2a to which an address is to be assigned, the master 1 transmits an ACK to the appliance 2a to which the address is to be assigned, and changes the address assignment information about the appliance corresponding to the assigned address on the address table into 'assigned', thereby changing into the house code assignment mode again (STEP 1-4).

Figure 5:
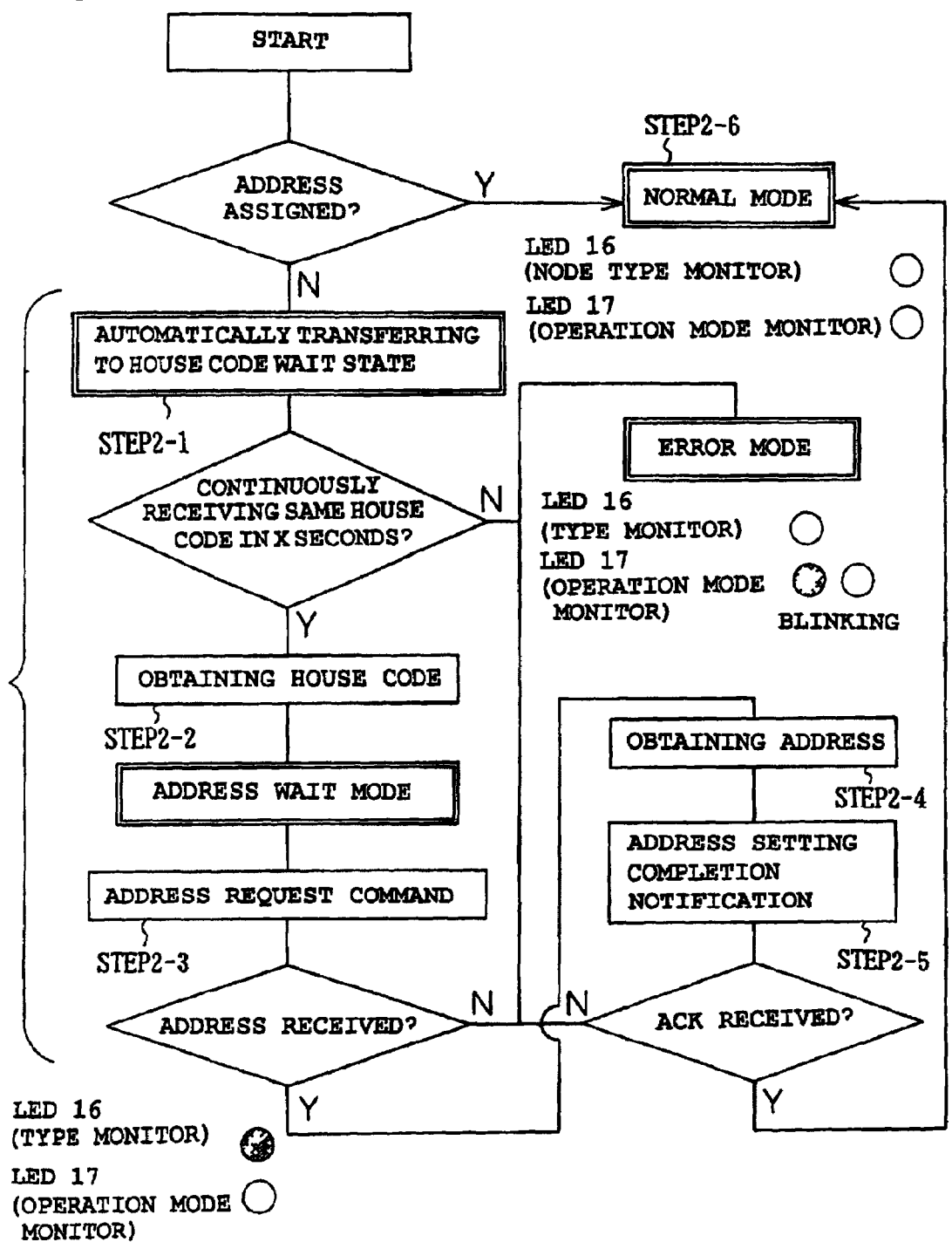
FIG. 5 is a flow chart of setting a house code and an address of an appliance according to the first embodiment of the present invention.

Described below is the operation of the appliance 2a according to the flow of being set a house code and an address to the appliance 2a, shown in FIG. 5.

When a user connects the appliance 2a to the power line 100, the processing unit 22 of the appliance 2a checks its own address recorded in the memory 23. If an address other than a provisional address is recorded, then the normal mode is entered.

If a provisional address is recorded, the state where the appliance is set of the house code and an address by the appliance (hereinafter the state is abbreviated as "the house code and address set state") is automatically entered (STEP 2-1).

The house code and address set state can be either a house code wait mode or an address wait mode. In the normal process, the house code wait mode is switched into the address wait mode.

If the appliance 2a successively receives the house code announcement data to be returned from the master 1 to the provisional address in a predetermined period including a formal house code a predetermined number of times (Y times in the figure) in a predetermined time period (X seconds in the figure) after changing into the house code wait mode, the appliance 2a records the house code in the memory 23, and sets them as its own house codes (STEP 2-2). Furthermore, the word "successively" means that the house code announce data including the same house code are successive. Hereinafter, the appliance 2a defines the house code as its own formal house code, and uses it as a house code used when an address request command described later is transmitted. An example of the operation of the processing unit 22 is counting the frequency of receiving provisional house codes, and comparing the frequency of successive reception of the house code announcement data with a predetermined set value of successive reception frequency. At this time, the house code announcement data to be counted is to include the same house code. Therefore, the house code announcement data including a different house code is not counted.

If the appliance 2a receives a plurality of different house codes in the above mentioned predetermined period in the above mentioned STEP 2-2, the house codes are discarded regardless of the reception order, and the setting and receiving operations are suspended. Furthermore, if no house code announcement data is received in the above mentioned predetermined period, the setting and receiving operations are also suspended.

The suspension period may be optionally set by a user, or the user can resume the operations. Thus, the problems that the house code from the control terminal set in the neighbor's house can be first assigned in the appliance 2a, or that the setting operation is suspended can be avoided to some extent.

Furthermore, in this process, the operation of the master 1 of setting a house code can be stopped by the appliance 2a transmitting a stop instruction to stop the operation of transmitting its own house code to a provisional address in a predetermined period together with the provisional house code of the master 1. Thus, the problem that a house code can be mistakenly set for another appliance installed in the neighbor's house can be avoided to some extent.

Then, the appliance 2a changes from the house code wait mode to the address wait mode after setting a house code.

The appliance 2a transmits an address request command to the master address together with the identification information for identification from other-appliances, for example, manufacture information, a product code, etc. (STEP 2-3).

The appliance 2a transmits an address request command to the master 1 together with the identification information for identification from other appliances, for example, manufacture information, a product code, etc. so as to avoid transmitting a formal address to a different appliance for which the same provisional address is mistakenly set by the master 1.

Upon receipt of the address transmitted after assigned the same identification information as that of the appliance 2a, the appliance 2a records the received address in the memory 23 (STEP 2-4) Afterwards, the appliance 2a defines the address as its own formal address.

If the appliance 2a cannot receive from the master 1 an address longer than a time-out period for any reason, then the appliance 2a enters an error mode.

In addition, after recording data in the memory 23, the appliance 2a transmits an address setting completion notification to the master address (STEP 2-5).

Then, upon receipt of an ACK in response to the address setting completion notification from the master 1, the appliance 2a determines that the house code and the formal address have been correctly set, and changes from the address wait mode to the normal mode (STEP 2-6).

If the appliance 2a cannot receive from the master 1 an address longer than a time-out period for any reason, then the appliance 2a enters an error mode.

The process procedure of the master 1 and the appliance 2a transmitting and receiving a command to set a house code and a formal address, and the master 1 setting a house code and a formal address for a newly connected appliance 2a is, with the error processing procedure, recorded in the processing units 12 and 22.

Figures 1, 16:
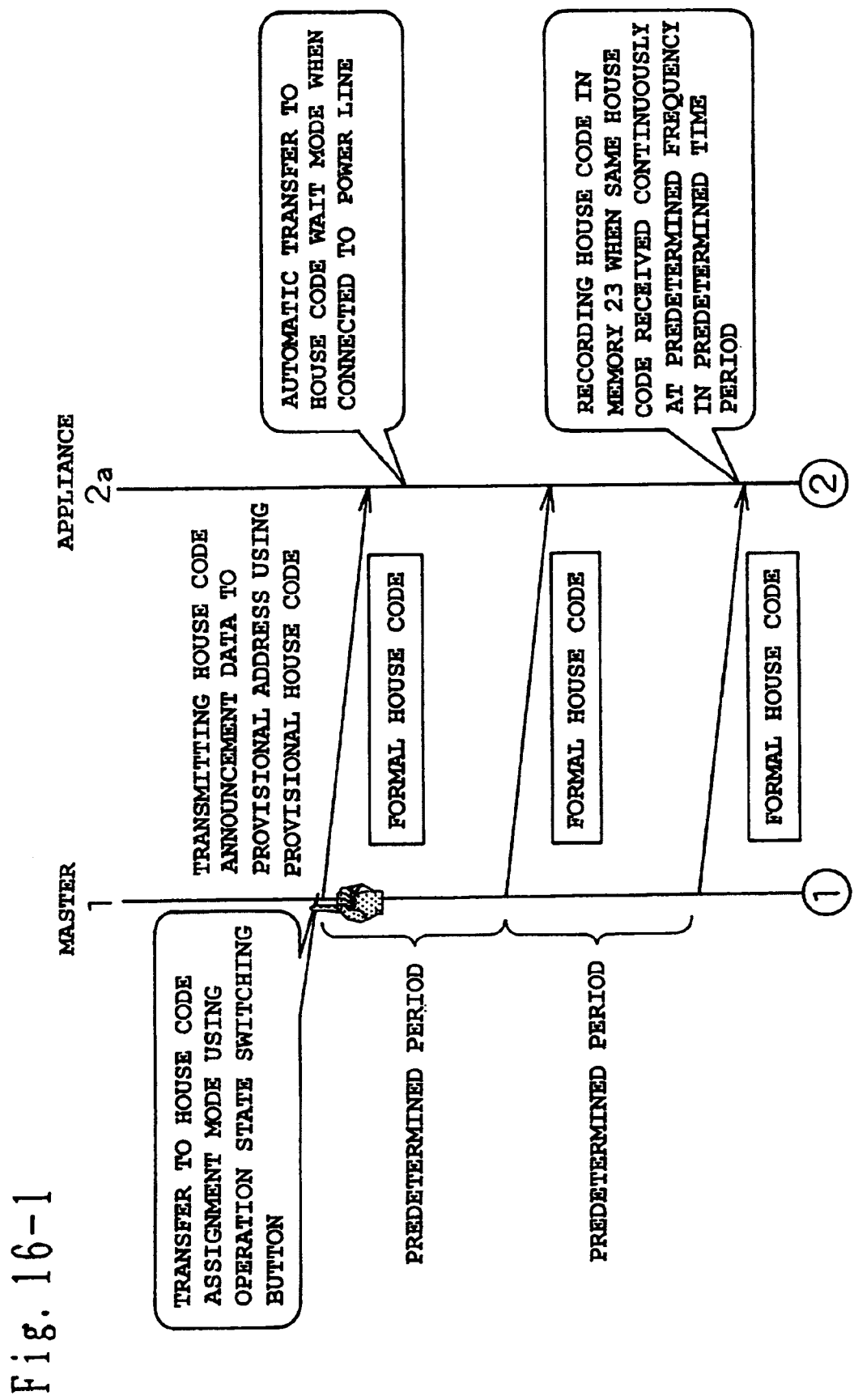
FIG. 16 shows the communications sequence of setting a house code and an address between the master and an appliance according to the first embodiment of the present invention.
Figures 2, 16:
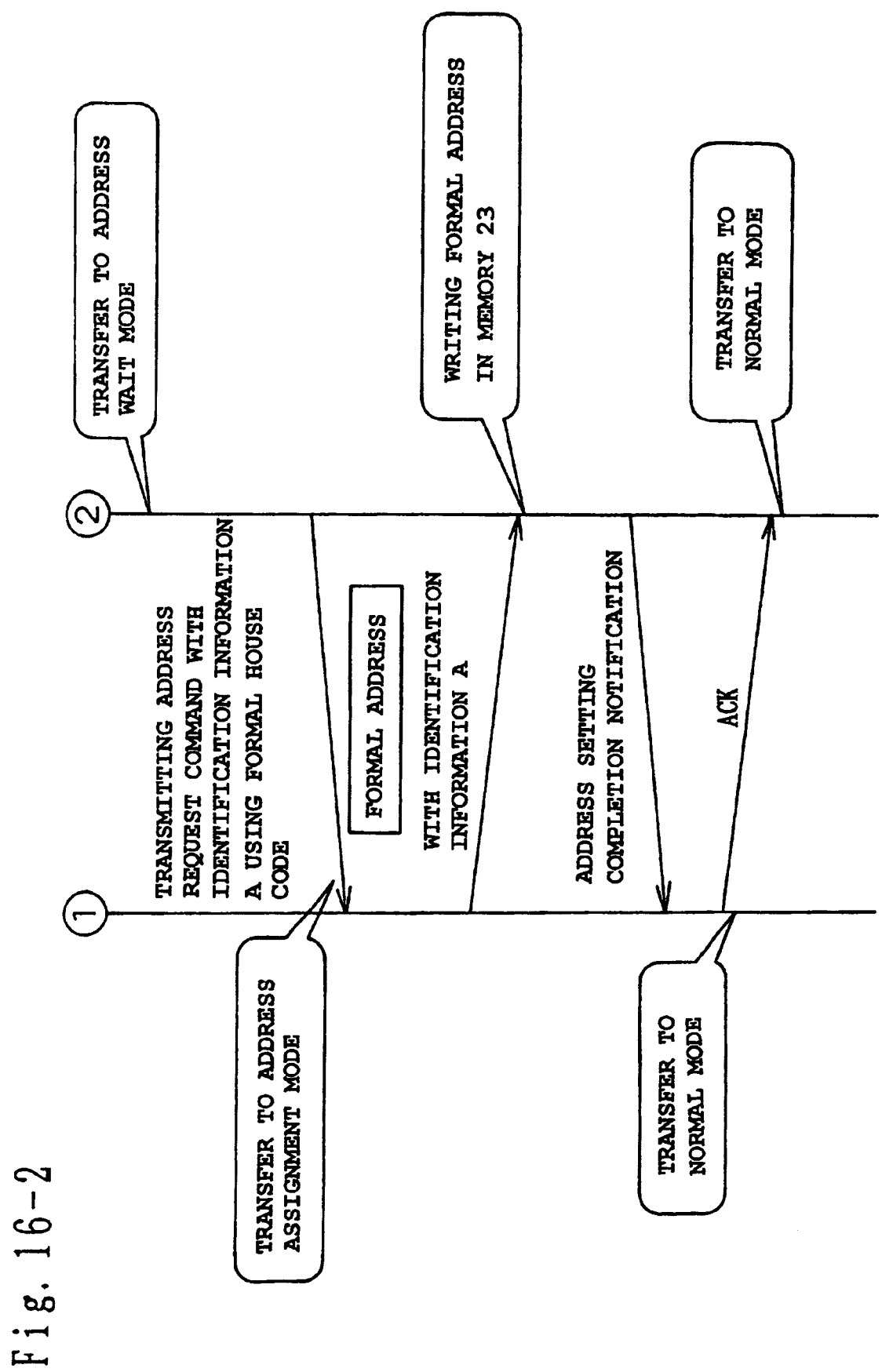

FIG. 16 shows a communications sequence of transmitting and receiving a command to set a formal house code and a formal address between the master 1 and the appliance 2a.

Figure 6:
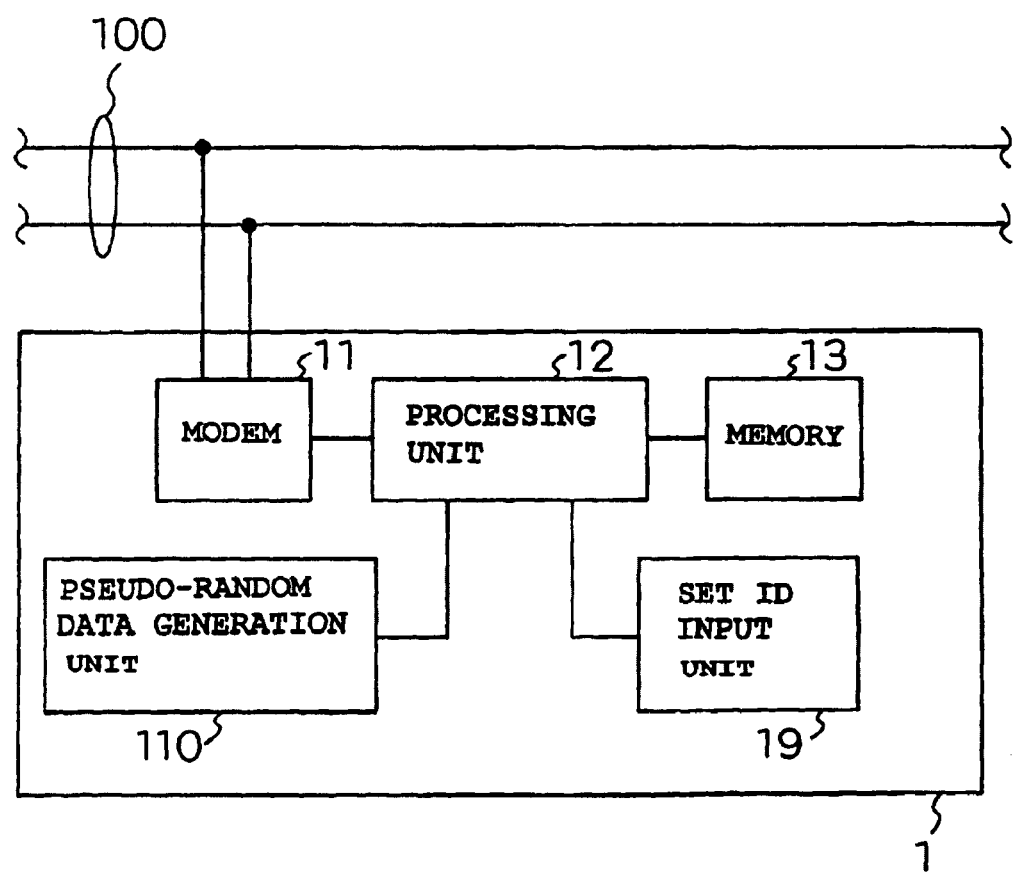
FIG. 6 shows an example of another configuration of an appliance according to the first embodiment.

In the above mentioned operation, the identification information included in the address request command can be, for example, the manufacturer information, a product code, etc. However, as shown in FIG. 6, the appliance 2a can be provided with a pseudo-random data generation unit 110 so that the processing unit 22 of the appliance 2a can generate address request data from the provisional address and the pseudo-random data generated by the pseudo-random data generation unit 110, and transmit the generated address request data to the power line communications network. The generated address request data is held in the memory 13.

Upon receipt of the address request data, the master 1 refers to a plurality of addresses stored in the memory 13, determines a formal address except one which is already assigned, generates address setting data from the formal address, the provisional address and the pseudo-random data contained in the address request data, and transmits the data to the power line communications network.

The processing unit 22 of the appliance 2a receives the address setting data, and compares the house code contained in the received address setting data with the house code held in the memory 13. If they match each other, and the comparison between the pseudo-random data contained in the address setting data and the pseudo-random data in the address request data held in the memory outputs a matching result, then it is determined that the address request data is the address request data addressed to the appliance 2a, thereby holding the formal address contained in the address request data in place of the provisional address stored in the memory 13.

According to the above mentioned embodiment, a house code can be set only by connecting an appliance to the power line and operating the master simultaneously. Thus, when a user operates a master and simultaneously connects an appliance to the power line, the problems that a house code can be mistakenly set for the controlled terminal of a neighbor, and that its own master house code can be mistakenly set for the master house code of the neighbor can be reduced in the power line system in which there can be invading data from a neighbor's house, or the leakage of data to the neighbor's house.

Furthermore, since a unique house code for each home in assigned only to the master, the house codes can be easily managed. In addition, after setting the house code, the address can be immediately and automatically set, thereby user can be free from consciously managing the address, and it is preventable to set the same addresses to a plurality of appliances through a mistaken operation.

In the above mentioned operations, the house code announcement data includes a house code. However, after the appliance 2a confirms obtained house code announcement data, and then the master 1 can assign only the house code to the appliance 2a for transmission of the data.

The predetermined continuous reception frequency set value can be arbitrarily changed by the user. The house code announcement data reception time period which is a predetermined period required for reception can also be arbitrarily changed.

In the above mentioned operation, a house code is set in the broadcast to a provisional house code. However, a user-set ID can be set between the master 1 and the appliances 2a to 2n to perform the broadcast using the ID as a setting ID in the setting operation.

Thus, the processing unit 12 transmits the house code and the set ID through the power line 100. The appliances 2a to 2n receive the house code and the set ID, compare the received set ID with their own IDs set by the set ID input unit, and set the received house code in place of the provisional house code if the comparison indicates a matching result. If they do not match, the setting operation is suspended.

When the house code and the address are set, the set ID is invalidated.

As shown in FIGS. 2 and 3, the set ID can be input by a user through a set ID input unit 19 in the master 1 and a set ID input unit 24 in the appliances 2a to 2n, and it is allowed that volume of the data can be settled easily and arbitrarily, for example, about 3 bit.

Thus, the operation of the setting a house code from the master belonging to another group, which is not desired by user, is not accepted and a mis-setting operation in which the house code announcement data transmitted from the master of the neighbor's house can be first set in the appliance of the user can be avoided in the state in which there is invading data to and from the neighbor's house which transmits house code announcement data using another master.

The master 1 can be an exclusive appliance having only the master function of setting a house code and an address for another appliance, or an appliance having the functions other than the master function can provide similar effects according to the embodiment of the present invention.

In the power line communications network, when a blocking filter is provided between the inside and the outside of a house, or between systems, the same effect can be obtained.

In the above mentioned operation, a house code and an address are set in the same flow, but the setting operation can be performed only once by setting the house code and the address to the same code. In addition, the address can be set before setting the house code.

(Second Embodiment)

Figure 7:
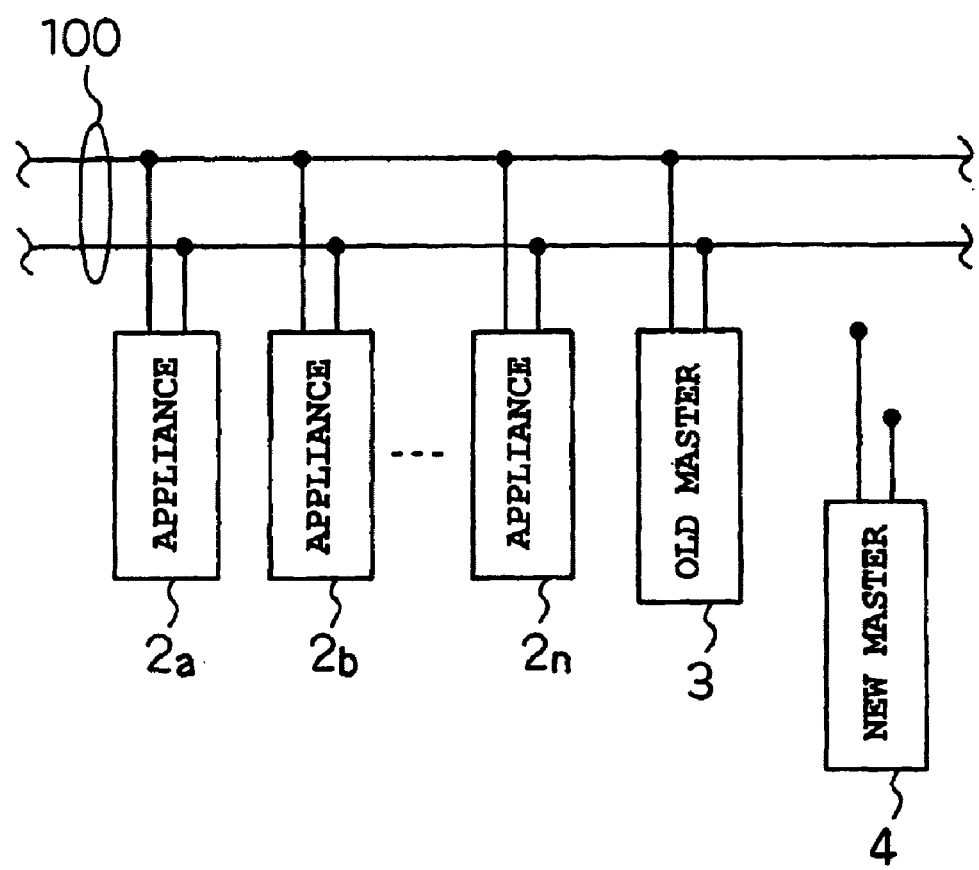
FIG. 7 shows a configuration of a power line communications network according to the second embodiment of the present invention.

Described below is a second embodiment of the present invention as shown in FIG. 7, that is, the method of transferring the master function from a master already existing in the power line communications network to a newly connected master by newly connecting a master having the master function of setting a house code and an address to another appliance.

The transfer of the master function is required when, for example, an old master already defined as a master is to be replaced with a newly purchased master. As described later, direct communications cannot be established between the power line communications network configured by an appliance connected to the power line communications network without invalidating the master function and an appliance assigned a house code by the original appliance according to the first embodiment and the power line communications network configured by an existing master and an appliance assigned in the relevant technology by the existing master because the components of these power line communications networks are assigned different house codes respectively.

Described below is a method of transferring a master existing in a power line communications network. In transferring a master, a master which already exists in the power line communications network and is finally to be replaced with another appliance is referred to as an old master 3, an appliance which is finally to replace the old master in the following procedure is referred to as a new master 4, and a master whose master function has been invalidated and which currently functions as an appliance is referred to as a potential master.

The process of transferring a master has the two important steps.

Step A: Entering a power line communications network of the master 4.

Step B: Transferring from a potential master to a new master in the master 4.

Figure 8:
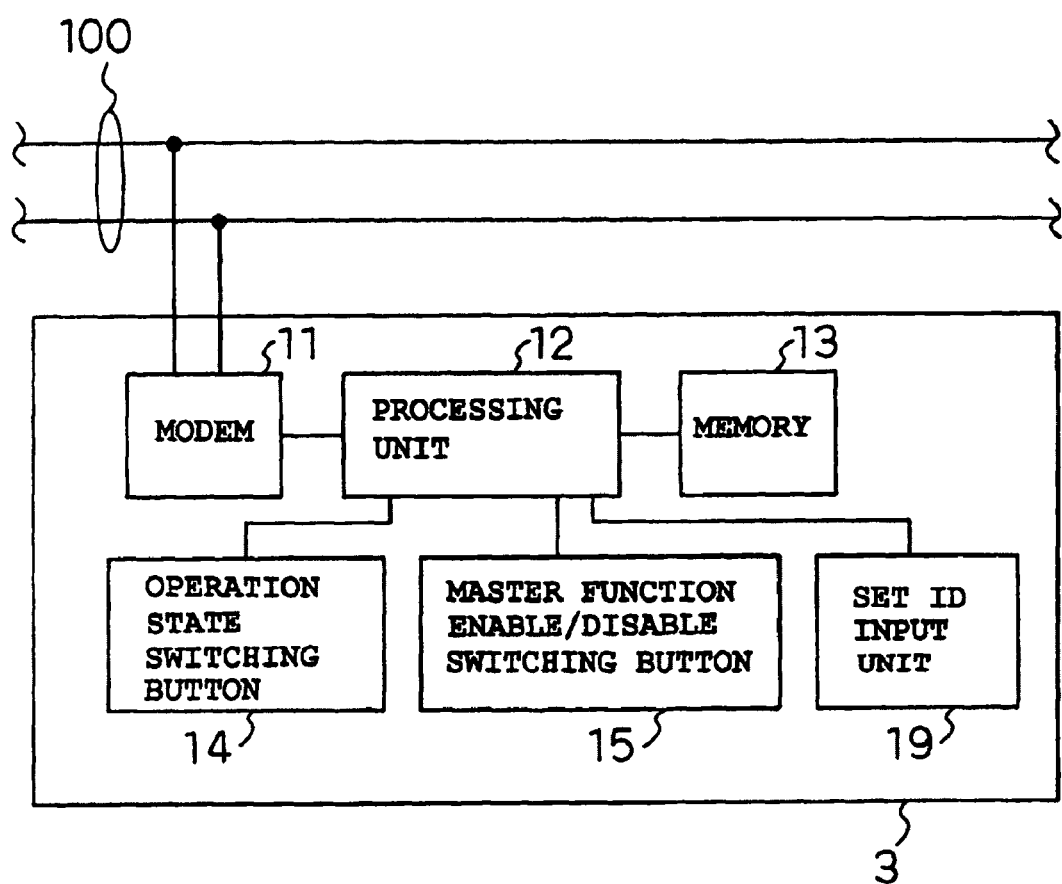
FIG. 8 shows the configurations of a new master and an old master according to the second embodiment of the present invention.

Described below is a flow of the master 4 in step A. As shown in FIG. 8, each of the old master 3 and the new master 4 is provided with a modem, a processing unit, memory, an operation state switching button, and a master function enable/disable switching button 15 as in the master 1 shown in FIG. 2. The details are described by referring to FIG. 8.

The second embodiment of the present invention with the above mentioned configuration is described below.

The user can be connected to the power line 100 with the master function enable/disable switching button 15 of the new master 4 pressed. In this operation, the master function of the new master 4 can be invalidated, thereby deleting the house code and the master address recorded in the memory 13. Then, the new master 4 automatically changes into the house code wait mode, and is assigned by the old master 3 the house code and the formal address of the old master 3 in the sequence described above.

The flow of setting a house code and an address in the old master 3 is the same as in the above mentioned embodiment shown in FIG. 4.

Figure 9:
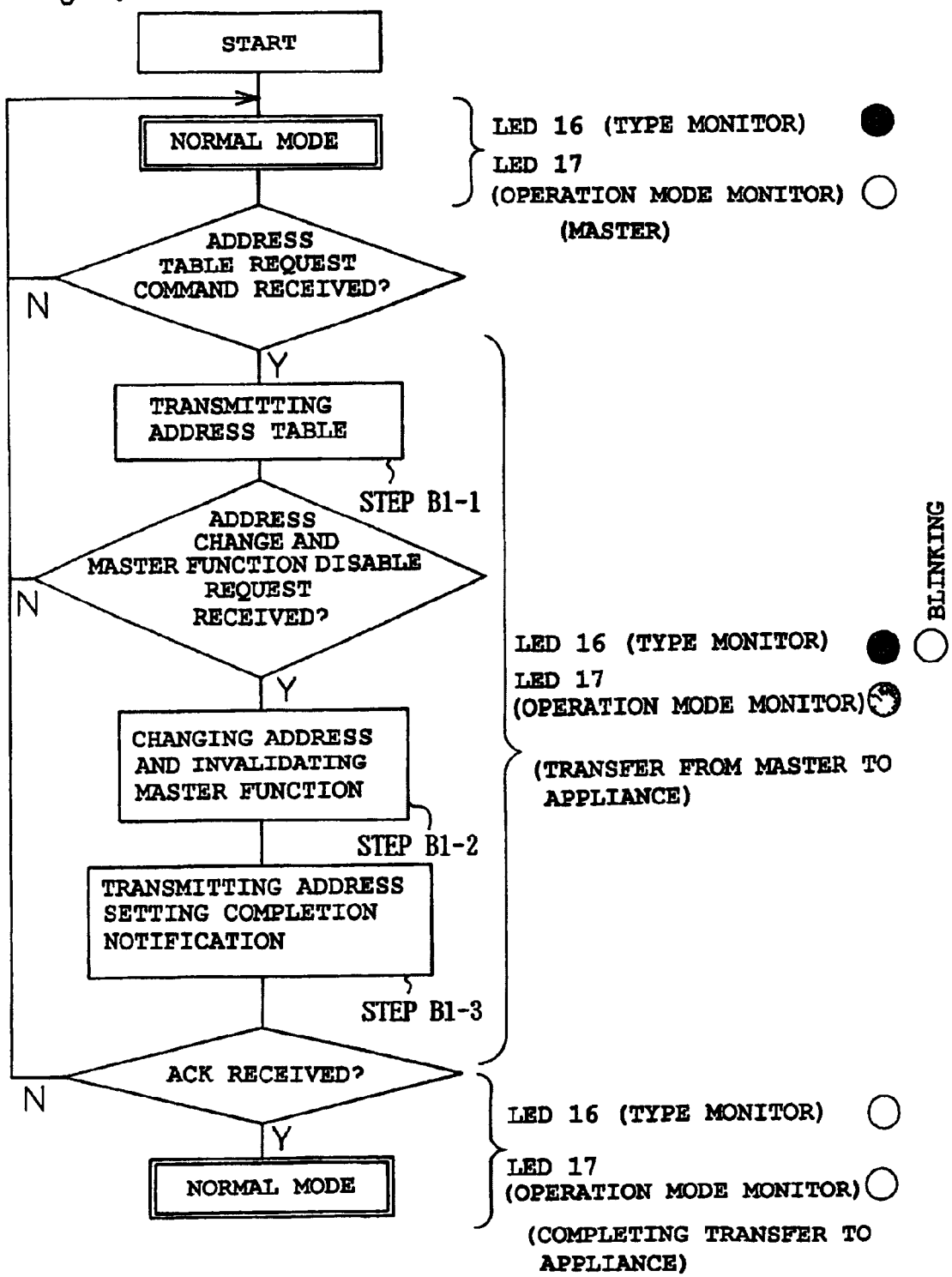
FIG. 9 is a flowchart of transferring a master function according to the second embodiment of the present invention.

The flow of the old master 3 in step B is described below by referring to FIG. 9.

Upon receipt of an address table request command from the new master 4 which is currently a potential master, the old master 3 transmits an address table to the new master 4 which is currently a potential master (STEP B1-1).

The address table contains addresses assigned to and managed for the other appliances 2a to 2n by the old master 3, the address assignment information provided for the appliances indicating whether or not addresses have been assigned to the appliances, and the frequencies of no-reply from the appliances in response to the reply request command of the old master 3 associated with each address, and is stored in the memory 13.

Then, upon receipt of a change request to an unused address and a master function disable request from the new master 4 in which the master function is being transferred from the currently potential master to a new master, the old master 3 changes the address from the master address to the unused address, and invalidates the master function (STEP B1-2).

When the old master 3 successfully switches the address and the master function, it transmits an address setting completion notification to the new master 4 in which the master function is being transferred from the currently potential master to the new master (STEP B1-3).

Then, upon receipt of an ACK from the new master 4 in which the master function is being transferred from the currently potential master to the new master, the old master 3 transfers to the normal mode, there by completing the transfer of the master function on the old master side.

Figure 10:
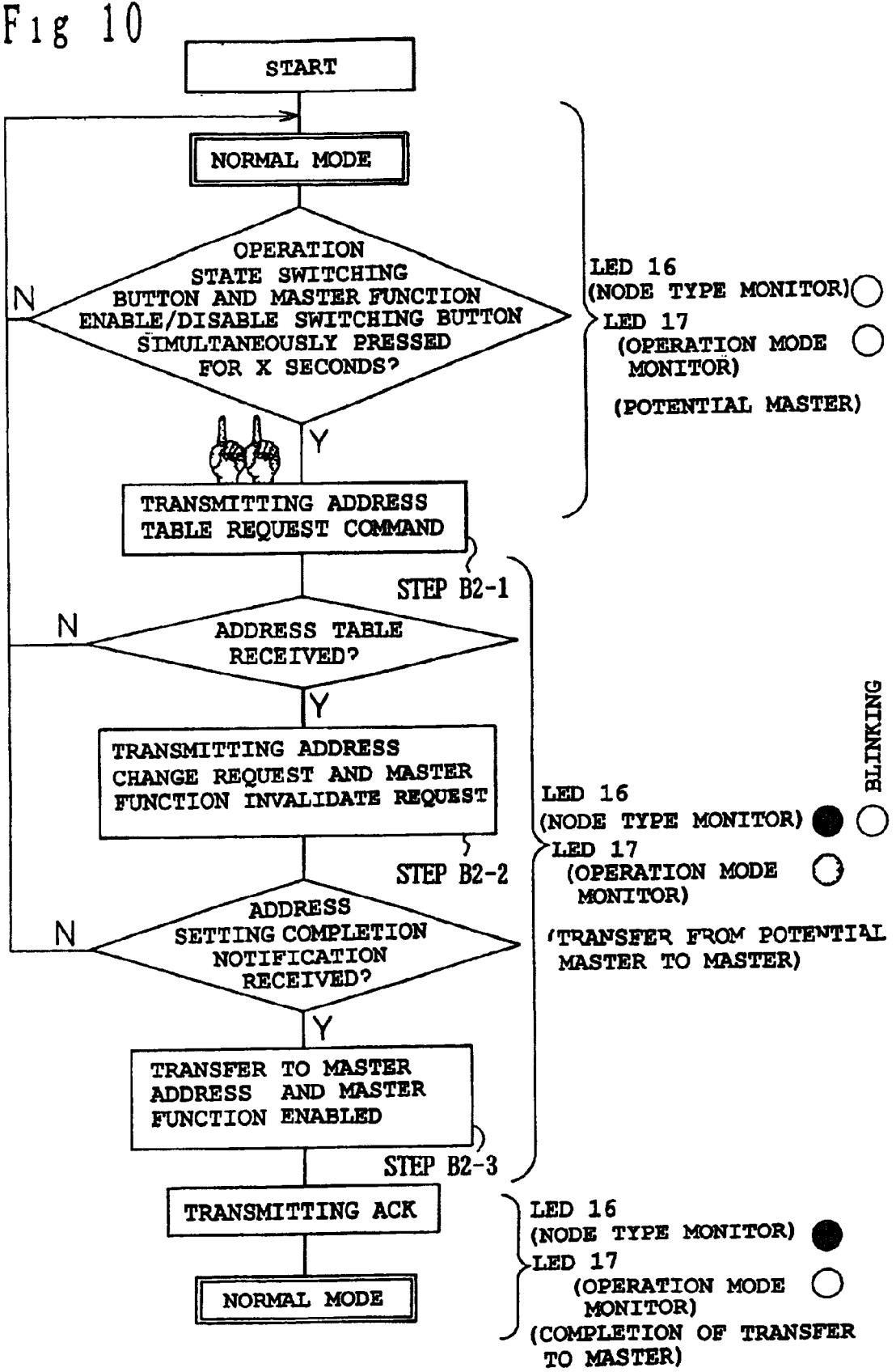
FIG. 10 is a flowchart of the transfer of a potential master to a new master according to the second embodiment of the present invention.

The flow of the new master 4 in step B is described below by referring to FIG. 10.

The new master 4 which is currently a potential master transmits an address table request command to a master address when, for example, a user simultaneously presses the operation state switching button 14 and the master function enable/disable switching button 15 for more than X seconds (STEP B2-1).

The user has to simultaneously press both of the operation state switching button 14 and the master function enable/disable switching button 15 for a longer time than that of a predetermined time period to prevent the user from mistakenly transferring the master function.

Then, upon receipt of an address table in response to the address table request command from the old master 3, the new master 4 in which the master function is being transferred from the currently potential master to the new master sets and records the address table, retrieves an unused address from the address table, and transfers an address change request to the unused address and a master function disable request to the old master 3 at the master address (STEP B2-2).

Furthermore, upon receipt of an address setting completion notification from the old master 3, the new master 4 in which the master function is being transferred from the currently potential master to the new master changes its own address from the current address to the master address, and enables the master function (STEP B2-3).

When the new master 4 in which the master function is being transferred from the currently potential master to the new master successfully changes the address and transfers the master function, it transmits an ACK to the old master 3, and transfers into the normal mode, thereby completing the transfer of the master function on the new master side.

According to the embodiment of the present invention, the operation state switching button 14 represented by a push button, etc. is described as operation state switch means by a user. In addition to the user direct input using a button, for example, an operation state switch command can be transmitted to the master using, for example, an infrared rays remote controller so as to switch the operation state of the master with the similar effect.

Likewise, the effect of the present invention can be obtained by transmitting a master function enable/disable switch command to the master using, for example, an infrared rays remote controller in addition to the direct user input button as master function enable/disable switch means.

The transferring procedure for the above mentioned master function is, with the error processing procedure, recorded in the processing unit 12 of the old and new masters 3 and 4.

To obtain the effect of the present invention, the master can be either an exclusive appliance having only the master function of setting house codes and addresses for other appliances, or an appliance having the functions other than the master function.

In the power line communications network, when a blocking filter is provided between the inside and the outside of a house, or between systems, the same effect can be obtained because it is the operation for the exchange of the master in the same network.

Figure 11:
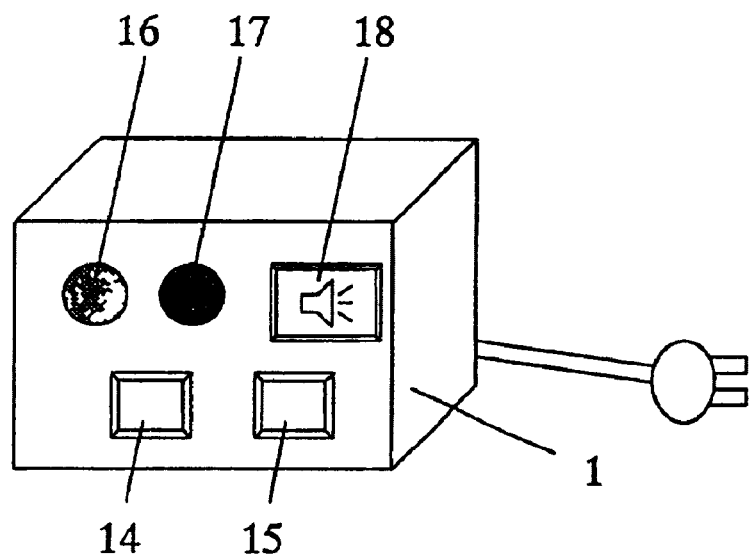
FIG. 11A shows an appearance of the master according to the first and second embodiments of the present invention.
FIG. 11B shows an appearance of the appliance according to the first and second embodiment of the present invention.
Figure 11:
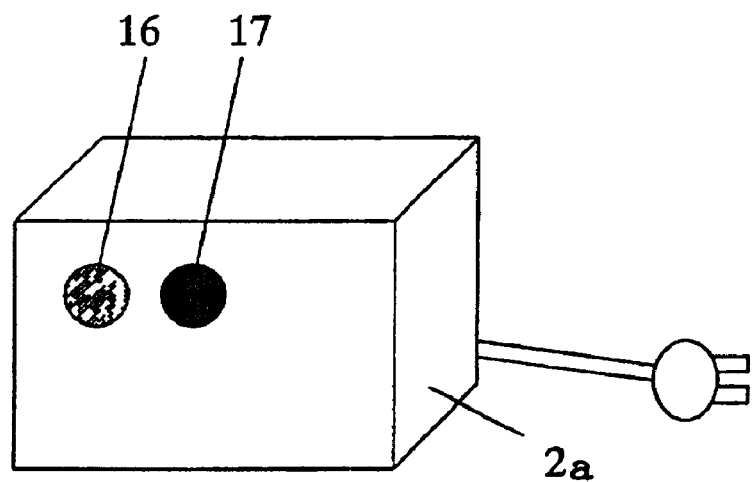

FIGS. 11A and 11B show examples of the appearances of the master 1, the old master 3, the new master 4, and the appliance 2a.

As shown in FIGS. 11A and 11B, as notification means, LEDs 16 and 17 explicitly indicate to the user the house code and address setting state of the master, and the house code and address set state of the appliance 2a, and a buzzer 18 can notify the user of the completion of setting a house code and an address. When a house code and an address cannot be successfully set or an unexpected house code or address is set due to a problem such as a communications error, etc., the notice of the state can be given by the LEDs 16 and 17, the buzzer 18, etc.

In this example, the LED 16 is defined as a type monitor LED as notification means, the master is lighted, the appliances other than the master is put out, and the appliances in the process of transferring from a master to an appliance or from an appliance to a master are blinking. The type monitor LED explicitly indicates a master or an appliance other than the master, or in the transfer process.

The LED 17 is defined as an operation mode monitor LED, the master is lighted in the house code and address setting state, the appliance is lighted in the house code and address set state, and is put out in the normal state. When an error occurs, the operation mode monitor LED blinks. The operation mode monitor LED explicitly indicates the current operation state of the master or the appliance.

As a result, a user can easily determine whether or not a house code and an address are to be set again, or whether or not hardware is to be reset (hard resetting).

FIGS. 4, 5, 9, and 10 show the house code and address setting state in the master 1, the old master 3, the new master 4, and the appliance 2a, and associated turning on/off state of the type monitor LED and the operation mode monitor LED.

(Third Embodiment)

Described below is a third embodiment of the power line communications network setting system and the power line communications setting method according to the present invention in which the master 1 deletes the addresses assigned to the appliances 2a to 2n from the information recorded on the address table depending on the connection states of the appliances 2a to 2n to the power line communications network.

The configurations of the master 1 and the appliances 2a to 2n are the same as in FIGS. 2 and 3. Therefore, the detailed explanation is omitted here. As in the second embodiment, the address table for management of the addresses of the appliances 2a to 2n is set in the master 1.

In the connection state of the appliances to the power line communications network in the following procedure, the method of reassigning an address already assigned, but determined by the master 1 as having been deleted from the power line communications network is effective in utilizing address resources.

Figure 12:
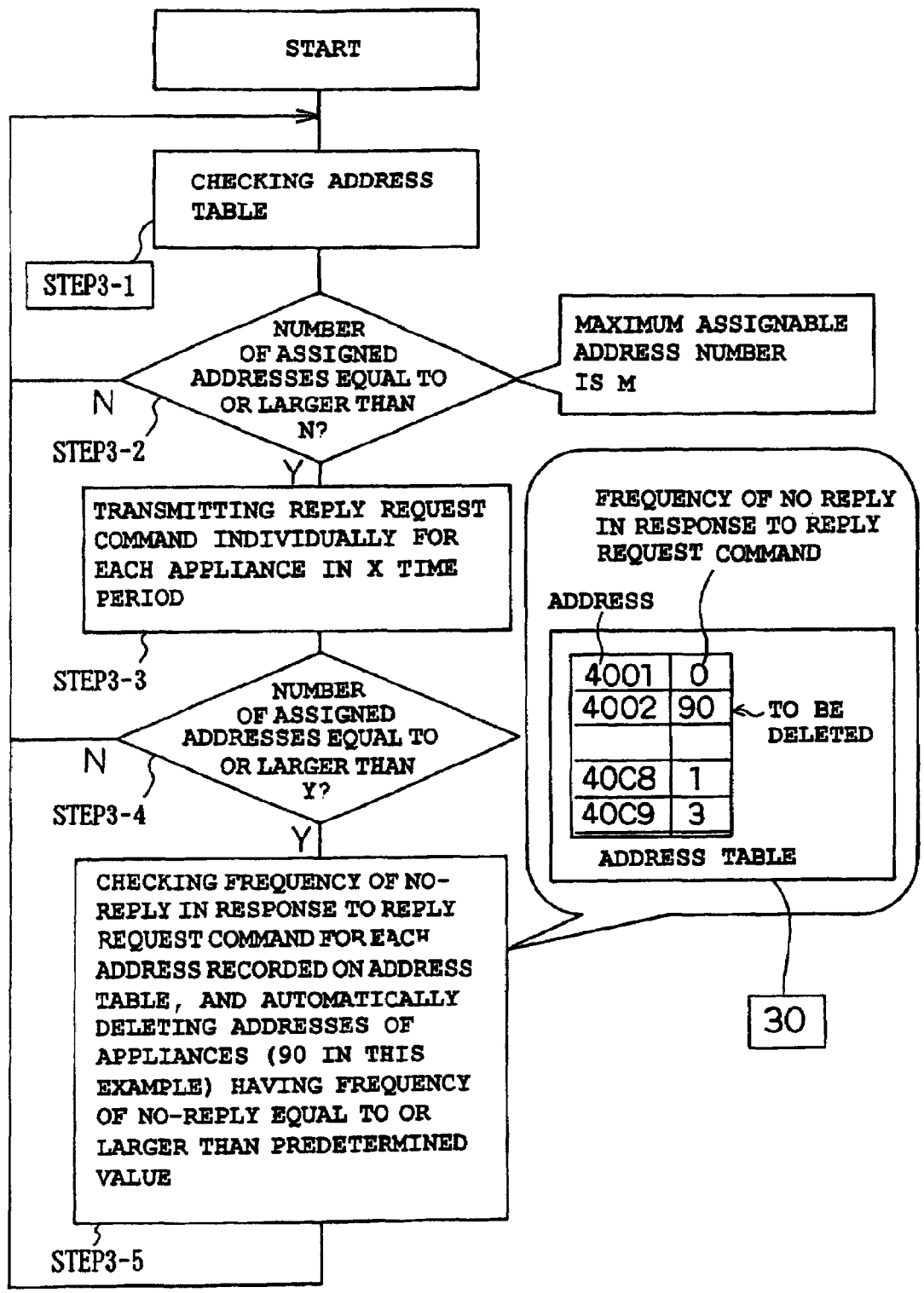
FIG. 12 is a flow chart of deleting an address on the address table according to the third embodiment of the present invention.

FIG. 12 shows an example of an address table 30 which is held by the master 1, and has the function of setting house codes and addresses for other appliances 2a to 2n connected to the power line communications network.

The address table 30 contains addresses assigned to and managed for the other appliances 2a to 2n by the master 1, the address assignment information provided for the appliances indicating whether or not addresses have been assigned to the appliances, and the frequencies of no-reply from the appliances in response to the reply request command of the master 1 associated with each address, and is stored in the memory 13.

The master 1 checks the number of assigned addresses according to the address assignment information for the address table 30 held by the master 1 at a predetermined timing (STEP 3-1).

If new appliances are sequentially connected to the power line communications network, and the master 1 determines that the number of addresses assigned by the master 1 to the appliances has exceeded, for example, the half (N) of the maximum number (M) of addresses which can be assigned by the master 1 (STEP 3-2), then the master 1 transmits a reply request command for a reply to the master sequentially to the assigned addresses at predetermined time intervals (once in X hours) (STEP 3-3).

If no reply can be obtained in response to the reply request command, the master 1 increases by 1 the frequency of no reply in response to the reply request command associated with the assigned-but-no-reply address, and recorded on the address table.

Furthermore, if the master 1 continues checking the number of assigned addresses at a predetermined timing, and determines that the number of assigned addresses has exceeded a predetermined value (Y) (STEP 3-4), then it checks the frequency of no reply in response to the reply request command which is associated with each assigned address, and recorded on the address table 30. Then, the master 1 changes the address assignment information for the appliance associated with the address indicating the frequency of no reply in response to the reply request command equal to or larger than the predetermined value from 'assigned' to 'unassigned' (STEP 3-5).

The master 1 changes the address assignment information for the appliance associated with the address indicating the frequency of no reply equal to or larger than the predetermined value from 'assigned' to 'unassigned' because it determines that the appliance has left the power line communications network longer than a predetermined period, and cannot return a reply in response to the reply request command.

Then, the master 1 reassigns to the appliance newly connected to a power line 400 the address whose address assignment information has been changed from 'assigned' to 'unassigned'. As a result, the address resources can be utilized in the address system in which the number of assigned and managed addresses is limited.

The process procedure of the master 1 deleting the addresses assigned to the appliances 2a to 2n and recorded on the address table 30 depending on the connection states of the appliances to the power line communications network is, with the error process procedure, in the master 1.

The master 1 can be an exclusive appliance having only the master function of setting a house code and an address for other appliances 2a to 2n, or an appliance having the functions other than the master function can provide similar effects according to the embodiment of the present invention.

The above mentioned effect of deleting an address based on the frequency of no reply in response to the reply request command can also be obtained by: sequentially updating and recording for each address on the address table 30 a reply request command transmission time which refers to the time at which the master transmits the reply request command (not the frequency of no reply in response to the reply request command), a reply reception time at which a reply of an appliance is received in response to the reply request command, or a reply time information contained in the reply from the appliance; comparing the current information about the reply request command transmission time, the reply reception time for each address, or the reply time information; and deleting the address of the appliance which has not received a reply in response to the reply request command longer than a predetermined time.

Furthermore, as described below, the effect described above can also be obtained by amending the address assignment information from 'assigned' to 'unassigned' about the appliance which has not sent a reply in response to the reply request command larger than the number of times of a predetermined value.

Figure 17:
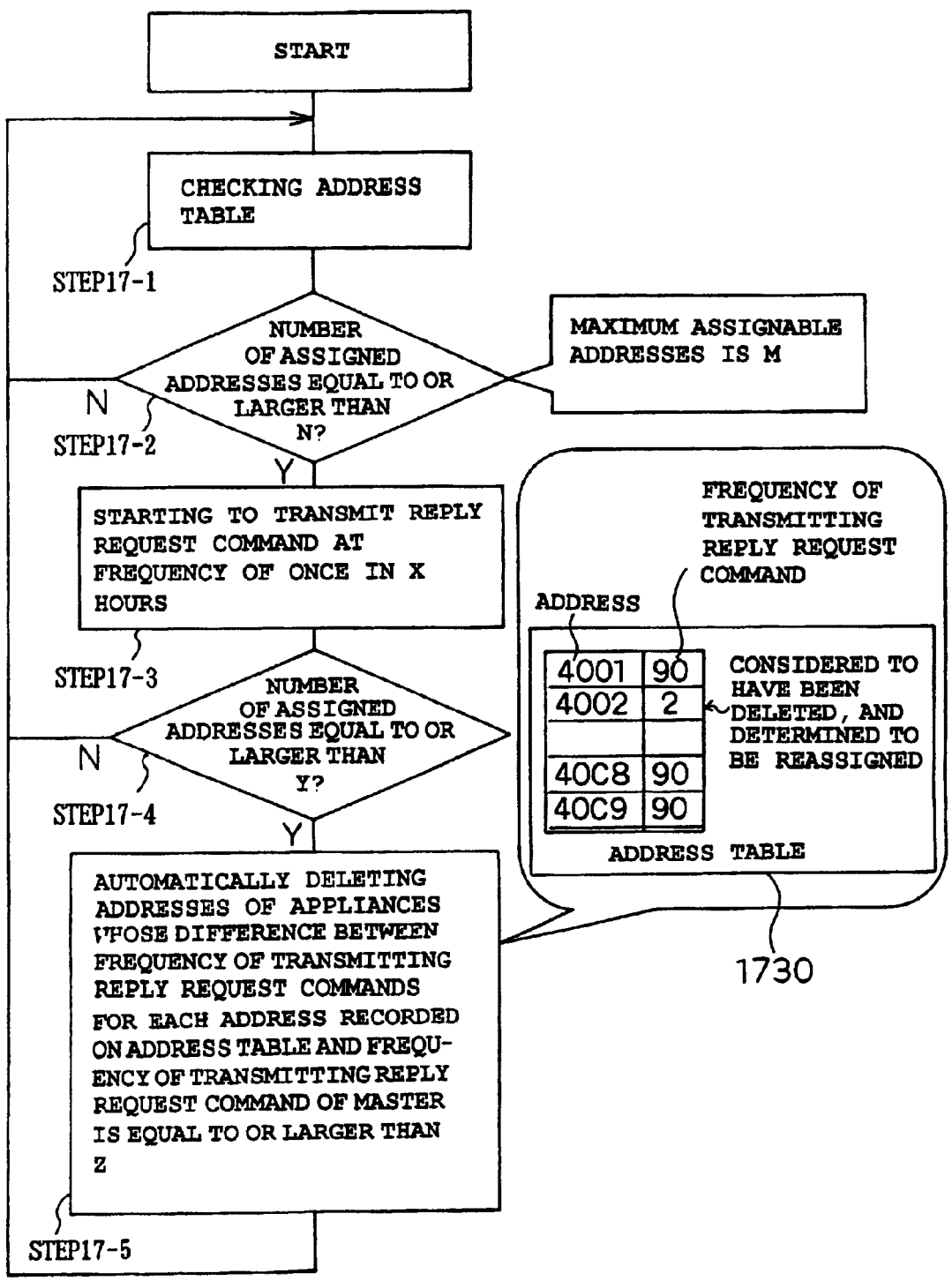
FIG. 17 shows another example of a flowchart of deleting address on the address table according to the third embodiment of the present invention.

FIG. 17 shows a flow of the process at the frequency of transmitting a reply request command.

The master 1 records the current frequency of transmitting a reply request command in the master 1 itself, and sequentially updates and records the frequency of transmitting a reply request command in response to the reply request command for each address on an address table 1730.

If the master 1 determines that the difference between the current frequency of transmitting a reply request command recorded by the master 1 and the frequency of transmitting a reply request command recorded for each address on the address table 1730 has exceeded a predetermined value, it changes the address assignment information, associated with the address for which the difference in the frequency of transmitting a reply request command has exceeded the predetermined value, for the appliance from 'assigned' to 'unassigned'. There occurs the difference between the current frequency of transmitting a reply request command recorded by the master 1 and the frequency of transmitting a reply request command recorded for each address on the address table 30 because the appliance has been deleted from the power line communications network, and cannot return a reply in response to the reply request command from the master.

At this time, by adjusting the determination value for the difference based on which the address assignment information about the appliance is changed from 'assigned' to 'unassigned', the period during which an appliance as a target of reuse of the address is deleted from and not connected to the power line communications network can be appropriately adjusted. An appropriate predetermined value to be taken into account in comparison with the difference between the frequencies of transmitting a reply request command can be arbitrarily set by the user.

In the power line communications network, when a blocking filter is provided between the inside and the outside of a house, or between systems, the same effect can be obtained because the master is switched in the same network.

(Fourth Embodiment)

A fourth embodiment of the present invention is described below by referring to the attached drawings.

Figure 13:
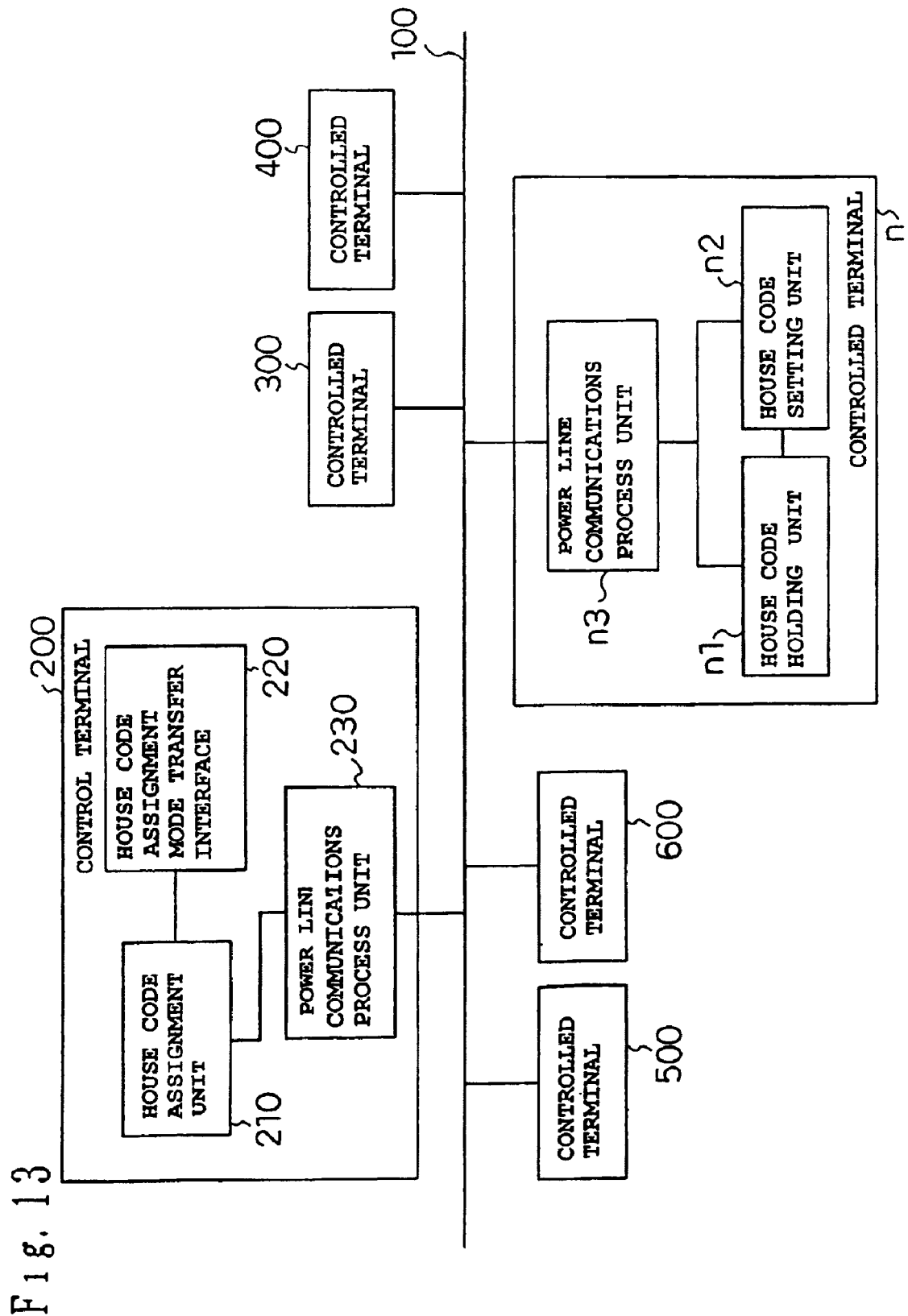
FIG. 13 shows a configuration of the communications setting system in the power line communications network according to the fourth embodiment of the present invention.

FIG. 13 shows an embodiment of the system of setting a house code in the power line communications control system according to the fourth embodiment of the present invention.

In FIG. 13, the power line communications control system according to the present invention comprises a control terminal 200 connected to the power line 100, and a plurality of controlled terminals 300 to n connected to the power line 100.

The control terminal 200 comprises a house code assignment unit 210, a house code assignment mode transfer interface 220, and a power line communications process unit 230.

The house code assignment unit 210 has nonvolatile memory not shown in FIG. 13 in which a unique house code in the world, and a unique provisional house code commonly used among other control terminals and controlled terminals are held when it is delivered from the factory, etc. Communications can be established between the control terminal 200 and the controlled terminals 300 to n, or among the controlled terminals 300 to n through the power line 100 by the power line communications process unit 230 assigning the held house code to the controlled terminals 300 to n connected to the power line 100 using the provisional house code.

The house code assignment mode transfer interface 220 provides a user interface for transfer to the house code assignment mode. The house code assignment mode transfer interface 220 can be configured by a user using a directly operable switch or button. At this time, the house code assignment mode transfer interface 220 is configured as a communications interface, and an application software interface such as a personal computer, etc., and also can be operated by a user on the screen of the application on the display of the personal computer. However, with the above mentioned configuration, the configuration for setting an address for mutual identification of the controlled terminals 300 to 600, and n is omitted here for simplification of explanation.

With the above mentioned configuration, the operation of the power line communications control system according to the embodiment of the present invention is described below, and an embodiment of the power line communications network setting system according to the present invention is described below.

In the operation performed by a user of the house code assignment mode transfer interface 220, when the control terminal 200 enters the house code assignment mode, it starts the operation of the house code assignment unit 210.

On the other hand, the controlled terminal n comprises a house code holding unit n1, a house code setting unit n2, and a power line communications process unit n3. The house code holding unit n1 is memory capable of holding a house code even during power-down. When the controlled terminal n enters the network connected to the power line 100, only a provisional house code is set in the house code holding unit n1 with a house code not set yet.

When the controlled terminal n is connected to the power line 100, it simultaneously checks whether or not a house code is set in the house code holding unit n1. If not, it detects that the provisional house code is set, transfers to the house code setting mode simultaneously when it is connected to the power line 100, thereby starting the operation of the house code setting unit n2.

When the house code assignment unit 210 of the control terminal 200 starts its operation, it periodically transmits to the power line communications process unit 230 a request to transmit house code announcement data including as data a house code held in advance by the control terminal 200.

The power line communications process unit 230 periodically receives from the house code assignment unit 210 the request to transmit house code announcement data, and broadcasts the house code announcement data to the power line 100.

When the house code setting unit n2 of the controlled terminal n starts its operation, it sets the power line communications process unit n3 such that the house code announcement data can be received through the power line 100, and receives the house code announcement data from the power line communications process unit n3 through the power line The house code setting unit n2 counts the frequency of receiving the house code announcement data, compares the frequency of successively receiving the house code announcement data containing the same house code with a predetermined continuous reception frequency set value. If the frequency of successively receiving the data in a predetermined period exceeds the continuous reception frequency set value, the house code contained in the house code announcement data is set in the house code holding unit n1 in place of the provisional house code, thereby terminating the house code setting mode. At this time, when the house code setting unit n2 receives plural pieces of house code announcement data containing different house codes, the house codes are discarded regardless of the reception order, and suspends the setting and receiving operations. The suspension period can be arbitrarily set by the user, or the user can resume the operations. Thus, the problem that the control terminal set in, for example, the neighbor's house can be first set in the controlled terminal n can be avoided to a certain extent.

In this process, the operation of the house code assignment unit 210 of the control terminal 200 can be stopped by the controlled terminal n transmitting a stop instruction to stop the operation of the house code assignment unit 210 of the control terminal 200. Thus, the problem that house code announcement data can be set first in the controlled terminal installed in, for example, the neighbor's house can be avoided to some extent.

After the controlled terminal n terminates the house code setting mode, the power line communications process unit n3 compares the house code held in the house code holding unit n1 with the house code contained in the data transmitted through the power line 100, and discards the data whose house code held in the house code holding unit n1 does not match the house code contained in the data transmitted through the power line 100.

The controlled terminal n adds to the power line the house code held in the house code holding unit n1 to the data to be transmitted, and transmits the data. Thus, the communications can be established only to the terminals having the same house code, thereby avoiding jamming signals from the terminals in other systems connected to the power line 100.

Furthermore, the house code setting unit n2 compares a predetermined house code announcement data reception time set value with the lapse of time after the house code setting unit n2 starts its operation, and terminates the operation of the house code setting unit n2 when the time lapsed after the house code setting unit n2 starts its operation exceeds the house code announcement data reception time set value.

In the above mentioned series of operations, the control terminal 200 can set house codes from a plurality of control terminals in a predetermined time period without setting a house code to each of a plurality of controlled terminals or assigning different addresses. Since the house code announcement data for a setting process is received at a predetermined frequency in a predetermined period, the noise entering through the power line and mistaken settings made when the house code announcement data from other control terminals is simultaneously input can be avoided.

In the above mentioned operations, the house code announcement data contains a house code, but the control terminal 200 can transmit only the house code after the controlled terminal n obtains the house code announcement data.

Additionally, a predetermined continuous reception frequency set value of the house code setting unit n2 can be arbitrarily changed by the user. A predetermined reception time period can also be arbitrarily set by the user.

(Fifth Embodiment)

Figure 14:
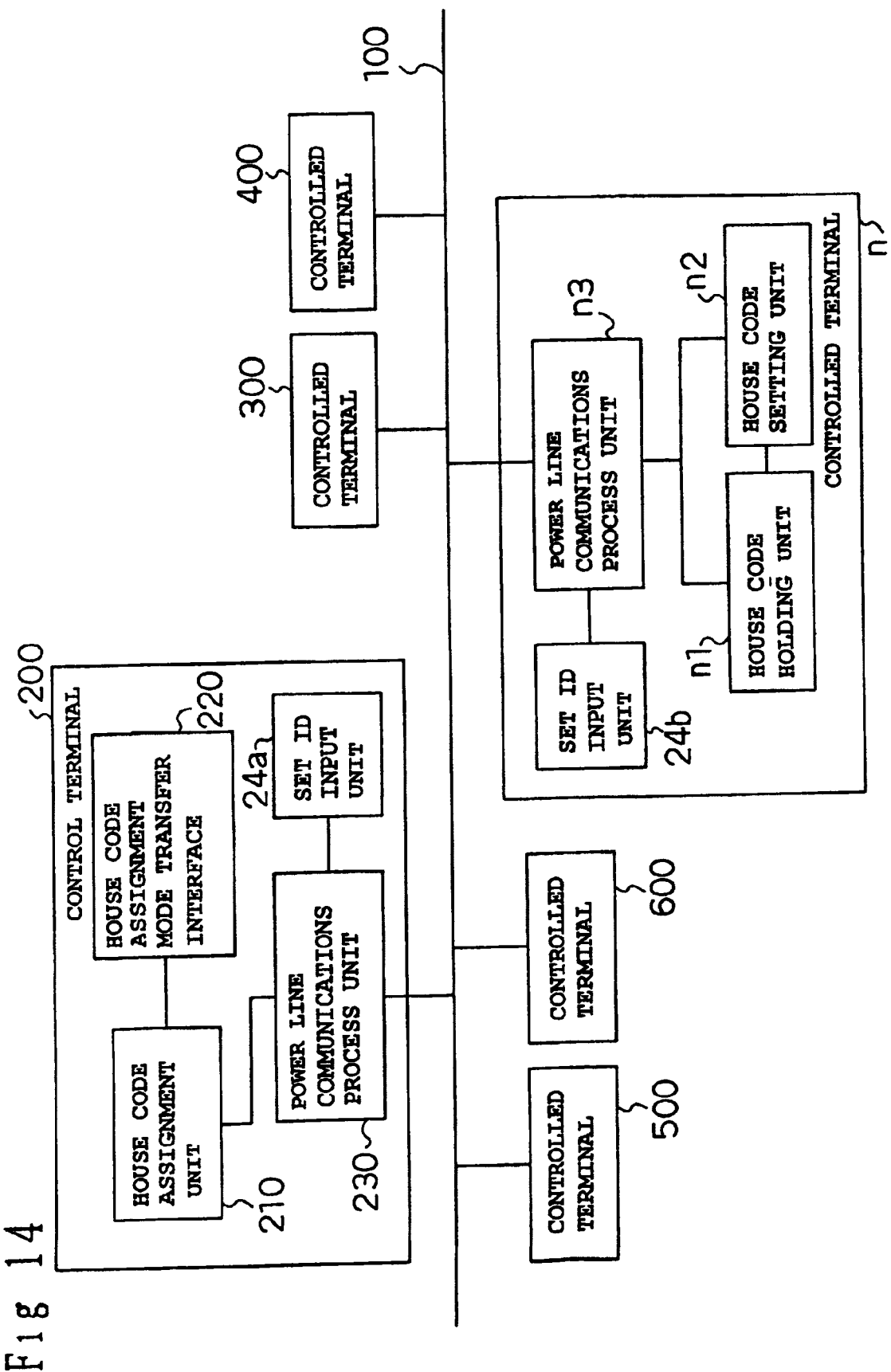
FIG. 14 shows a configuration of the communications setting system in the power line communications network according to the fifth embodiment of the present invention.

FIG. 14 shows an embodiment of the house code setting system of the power line communications control system according to a fifth embodiment of the present invention. In FIG. 14, the same units or corresponding portions are assigned the same reference numerals, and the detailed explanation is omitted here. Reference numerals 24a and 24b denote set ID input unit.

With the above mentioned configuration, the operations of the power line communications control system according to the embodiment is basically the same as the operations according to the fourth embodiment except that the above mentioned operations are performed after the user sets a predetermined set ID for the control terminal 200 and the controlled terminal n using the set ID input unit 24a and 24b before communicating the house code announcement data with the controlled terminal n.

Thus, the house code assignment unit 210 of the control terminal 200 stores the set ID together with the house code in the house code announcement data, and broadcasts the house code announcement data through the power line 100. The house code setting unit n2 of the controlled terminal n receives the house code announcement data. At this time, the house code setting unit n2 compares the set ID contained in the received house code announcement data with the set ID set by its own ID input unit. If they match each other, then the house code setting unit n2 sets the house code contained in the house code announcement data in the house code holding unit n1 in place of the provisional house code, thereby terminating the house code setting mode. If they do not match each other, the setting operation is suspended.

The set ID can be as complicated as the user can arbitrarily set it. That is, the data can be as large as 3 bits.

Thus, setting a house code from a control terminal belonging to another group not desired by the user can be rejected. Therefore, a mis-setting operation in which the house code announcement data transmitted from another control terminal can be first set in the controlled terminal n can be avoided in the state in which there is jamming data to and from the neighbor's house which transmits house code announcement data using another control terminal.

(Sixth Embodiment)

Figure 15:
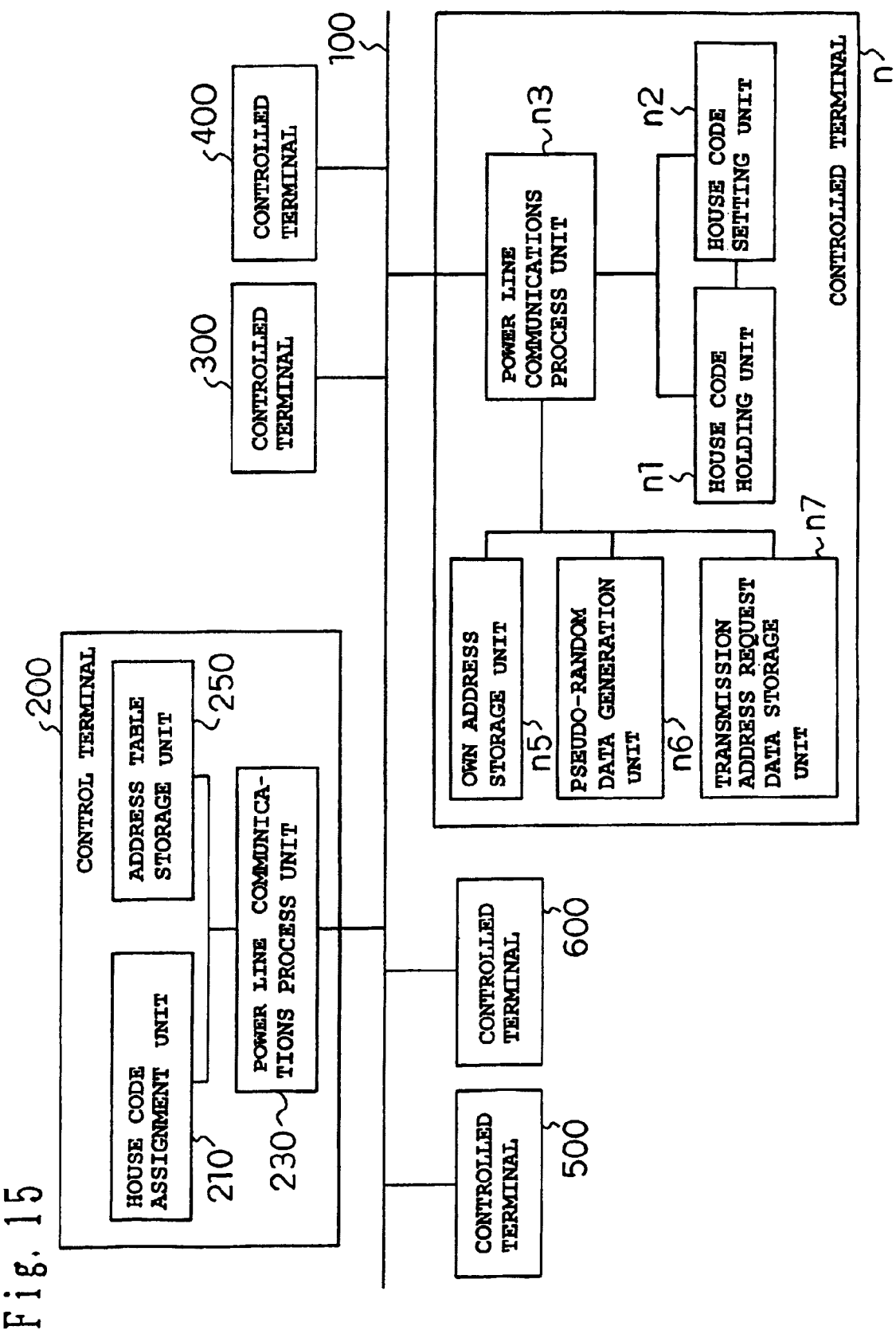
FIG. 15 shows a configuration of the power line communications control system according to the sixth embodiment of the present invention.

FIG. 15 shows an embodiment of the address setting system of the power line communications control system according to a sixth embodiment of the present invention.

The controlled terminal n comprises the house code holding unit n1, the house code setting unit n2, an own address storage unit n5, a pseudo-random data generation unit n6, the power line communications process unit n3, and a transmission address request data storage unit n7. The own address storage unit n5 stores in advance a predetermined provisional address for provisional identification of its own node, and comprises the memory capable of holding addresses even during power-down.

On the other hand, the control terminal 200 comprises the address table storage unit 250, the power line communications process unit 230, and the house code assignment unit 210. The address table storage unit 250 is kind of a memory that holds a plurality of formal addresses assigned to the controlled terminals 300 to n2, and can hold the plurality of formal addresses even during power-down.

The power line communications process unit n3 of the controlled terminal n forms address request data from the provisional address stored in the own address storage unit n5 and the pseudo-random data generated by the pseudo-random data generation unit n6 after the house code holding unit n1 sets a house code in the house code setting unit n2, and transmits the data to the control terminal 200 through the power line 100. The transmission address request data storage unit n7 holds the pseudo-random data contained in the address request data transmitted to the control terminal 200.

Upon receipt of the address request data, the power line communications process unit 230 of the control terminal 200 requests the house code assignment unit 210 to terminate the house code assignment mode to stop the operation of the house code assignment unit 210.

Furthermore, the power line communications process unit 230 refers to the plurality of addresses stored in an address table storage unit 250, determines a non-overlapped formal address, configures address setting data from the formal address, the provisional address contained in the received address request data, and the pseudo-random data, and transmits the data through the power line 100.

The power line communications process unit n3 of the controlled terminal n receives the address setting data, and compares the house code contained in the address setting data with the house code held in the house code holding unit n1. If they match each other, and if a matching result is also obtained from the comparison between the pseudo-random data contained in the address setting data and the pseudo-random data held in the transmission address request data storage unit, then the power line communications process unit n3 determines that the address setting data is address request data addressed to the unit n3, replaces the provisional address held in the own address storage unit n5 with the formal address contained in the address request data, and stores the formal address in the own address storage unit n5.

In the above mentioned series of operations, an address can be set for a terminal requesting to use the function of the power line communications control.

According to each embodiment of the present invention, a house code can be set only by connecting a controlled terminal to the power line and simultaneously operating the interface of a control terminal. Thus, by the user simultaneously operating an interface of a control terminal and connecting a controlled terminal to the power line, the problems that a house code can be mistakenly set for the control terminal of a neighbor's house, and that the house code of the control terminal can be mistakenly set for the house code of the control terminal of the neighbor's house can be reduced in the power line system in which there can be invading data from a neighbor's house, or the leakage of data to the neighbor's house.

Since a unique house code can be assigned only to a control terminal of each home, the house codes can be easily managed. Furthermore, after setting a house code, an address can be quickly and automatically set. Therefore, the user can unconsciously manage the address and avoid a mistaken setting of the same address to a plurality of appliances.

In the description above, the operations according to the first or fifth embodiment and the operations according to the sixth embodiment have been described as the operations performed in a time series order, but the present invention is not limited to this application, but can define the settings of a house code and an address as simultaneously performed processes. That is, the operation according to the fourth or fifth embodiment and the operation according to the sixth embodiment can be incorporated into one operation by transmitting to a provisional address with the house code announcement data and the address setting data transmitted together, or with the house code announcement data having the contents of the address setting data.

Furthermore, in each of the above mentioned embodiments of the present invention, the house code announcement data corresponds to the house code notification according to the present invention, and the address request command corresponds to the address request command according to the present invention.

In the explanation above, the operation of setting a house code and the operation of setting an address are performed in a time series order, but the present invention is not limited to this application, but can define the settings of a house code and an address as simultaneously performed processes. That is, the operation of setting a house code and the operation of setting an address can be incorporated into one operation by transmitting to a provisional address with the house code announcement data and the address setting data transmitted together, or with the house code announcement data having the contents of the address setting data.

The present invention can be a program working in cooperation with a computer for directing the computer to perform the functions of the device having the master function of setting a house code or an address for another appliance according to the present invention, or of means (or a device, element, circuit, unit, etc.) of the device to be controlled by the device having the master function.

In addition, the present invention can be a computer-readable medium, with which the program read by the computer performs the functions in cooperation with the computer, for storing the program for causing a computer to perform the function according to the present invention.

A computer-readable recording medium recording the program of the present invention can also be included in the present invention.

In a usage pattern of the program according to the present invention, the program can be stored in a computer-readable storage medium and may be an aspect for cooperation with the computer.

In a usage pattern of the program according to the present invention, the program can also be transmitted through a transmission medium, read by a computer, and works in cooperation with the computer.

Additionally, the data structure of the present invention includes a database, a data format, a data table, a data list, the type of data, etc.

A recording medium can be ROM, etc., and a transmission medium can be a transmission mechanism such as Internet, light, electric wave, sound wave, etc.

The computer according to the present invention is not limited to the hardware such as a CPU, etc., but can be a firmware, an OS, a peripheral device, etc.

As described above, the configuration of the present invention can be represented as software, hardware, etc.

As clearly described above, the present invention can easily set communications among appliances without assigning in advance a unique address or setting an address without overlaps when a system is installed.

Furthermore, the addresses assigned and connected appliances can be easily managed after the setting operations.

What is claimed is:

1. A method of transferring a master function of a first device used to set a house code or a terminal address of a second device and connected to a communications network system which performs data communications among a plurality of devices through a power line, the device including the master function and an address table holding terminal addresses which are assignable to other devices comprising the steps of:
   transmitting the address table from a first device to a second device when the first device receives from the second device an address table transmission request indicating a transmission request of the address table,
   upon receipt of the address table from the first device, retrieving by the second device from the address table an unused address which is assignable as a terminal address to the first device, and transmitting to the first device a request to change a terminal address into the unused address and a request to invalidate the master function; and
   enabling a master function of the second device when the first device changes a terminal address thereof into the unused address, and invalidates the master function of the first device.

2. The method according to claim 1, wherein
   transmitting by the second device to the first device an address table transmission request indicating a transmission request of the address table by a user operation.

3. A communications network system which performs data communications through a power line among a plurality of devices including a first device and a second device comprising a terminal address and a master function of setting a house code or a terminal address,
   the first device comprises means of holding an address table which holds terminal addresses assignable to other devices, means of receiving an address table transmission request to transmit the address table, and means of transmitting the address table;
   the second device comprises means of transmitting the address table transmission request, means of receiving the address table, means of retrieving from the address table received by means of receiving an unused address which can be assigned as a terminal address to another device, and means of transmitting a request to change the terminal address into the unused address and a request to invalidate the master function; and
   the second device enables its own master function when the first device changes the terminal address into the unused address and invalidates the master function.

4. A device which has a master function, and is connected to a communications network system which performs data communications through a power line, comprising
   the master function is to set a house code or a terminal address of one or more other devices and
   the device comprises means of storing an address table holding terminal addresses assignable to the one or more other devices, means of receiving an address table transmission request from one of the other devices to transmit the address table, so as to transfer the master function to the one other device and means of transmitting the address table to the one other device at the address table transmission request.

5. The device according to claim 4, wherein
   when the device that is a present master receives a terminal address, a request to change the terminal address, and a request to invalidate the master function from the one other device to be a next master, the terminal address of the device that is the present master is changed to the terminal address received, and the master function is invalidated.

6. The device according to claim 5, wherein
   an address setting completion notification indicating that the address has been changed into the terminal address received, and that the master function has been invalidated is transmitted.

7. The device according to claim 4, wherein
   the address table includes address assignment information indicating whether or not a terminal address has been assigned.

8. A device which has a master function and is connected to a communications network system, comprising
   the master function is to set a house code or a terminal address to another device; and the device comprises:
   means of obtaining an address table holding terminal addresses assignable to other devices; and
   means of extracting a terminal address assignable to another device from the address table, and transmitting the terminal address, a request to change into the terminal address, and a request to invalidate a master function of another device having the master function.

9. The device according to claim 8, wherein
   the address table further includes address assignment information indicating whether or not a terminal address has been assigned to said another device.

10. The device according to claim 9, wherein
    after receiving the address setting completion notification, the master function of the device is enabled.

* * * * *